United States Patent
Rugeland et al.

(10) Patent No.: US 12,058,546 B2
(45) Date of Patent: Aug. 6, 2024

(54) MEASUREMENTS FOR CARRIER AGGREGATION/DUAL CONNECTIVITY SETUP

(71) Applicant: TELEFONAKTIEBOLAGET LM ERICSSON (PUBL), Stockholm (SE)

(72) Inventors: Patrik Rugeland, Stockholm (SE); Icaro Leonardo Da Silva, Solna (SE); Oumer Teyeb, Montréal (CA); Ali Nader, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 294 days.

(21) Appl. No.: 17/431,220

(22) PCT Filed: Feb. 13, 2020

(86) PCT No.: PCT/IB2020/051220
§ 371 (c)(1),
(2) Date: Aug. 16, 2021

(87) PCT Pub. No.: WO2020/165846
PCT Pub. Date: Aug. 20, 2020

(65) Prior Publication Data
US 2022/0116810 A1    Apr. 14, 2022

Related U.S. Application Data

(60) Provisional application No. 62/805,810, filed on Feb. 14, 2019.

(51) Int. Cl.
*H04W 24/10*    (2009.01)
*H04W 28/02*    (2009.01)
(Continued)

(52) U.S. Cl.
CPC ....... *H04W 24/10* (2013.01); *H04W 28/0278* (2013.01); *H04W 76/19* (2018.02); *H04W 76/20* (2018.02)

(58) Field of Classification Search
CPC ..... H04W 24/10; H04W 28/02; H04W 76/19; H04W 76/20; H04W 76/18; H04W 24/08;
(Continued)

(56) References Cited

U.S. PATENT DOCUMENTS 10,785,817 B2 * 9/2020 Palat ................. H04W 76/15
10,855,359 B2 * 12/2020 Zhou ................. H04B 17/17
(Continued)

FOREIGN PATENT DOCUMENTS

EP    1617606 A1    1/2006
EP    2234434 B1    10/2012
(Continued)

OTHER PUBLICATIONS

Ericsson, "Summary of email discussion [106#38][NR/DCCA]: SCG and MCG SCell Configuration with RRC Resume", 3GPP TSG-RAN WG2 #107, R2-1910291. Aug. 26-30, 2019, Prague, Czech Republic.
(Continued)

Primary Examiner — Man U Phan
(74) Attorney, Agent, or Firm — Sage Patent Group

(57) ABSTRACT

According to some embodiments, a method performed by a wireless device comprises: determining a characteristic of data for transmission between the wireless device and a network node; determining the wireless device is configured to send measurement information to the network node; and transmitting an indication of the determined characteristic of data for transmission to the network node with the measurement information. In particular embodiments, the measure-
(Continued)

900

912 – obtaining a configuration instructing the wireless device to report an indication of the characteristics of data for transmission to the network node with measurement information 914 – determine a characteristic of data for transmission between the wireless device and a network node 916 – determine the wireless device is configured to send measurement information to the network node 918 – transmit an indication of the determined characteristic of data for transmission to the network node with the measurement information ment information comprises an indication that measurements are available or a measurement report.

27 Claims, 16 Drawing Sheets

(51) Int. Cl.
*H04W 76/19* (2018.01)
*H04W 76/20* (2018.01)

(58) Field of Classification Search
CPC ......... H04W 36/0079; H04W 36/0085; H04W 36/08; H04W 36/305; H04W 74/0833; H04W 80/02; H04W 36/00; H04W 36/30; H04W 76/00; H04W 28/04; H04W 16/32; H04W 48/16; H04W 72/04; H04W 76/15; H04W 76/11; H04W 76/27; H04W 36/04; H04W 36/28; H04W 16/24; H04L 1/18; H04L 5/006; H04L 1/867; H04L 1/189; H04L 51/30; H04L 5/001; H04L 5/0098; H04L 1/1867
USPC .......................................................... 370/329
See application file for complete search history.

(56) References Cited

U.S. PATENT DOCUMENTS

| | | | | |
|---|---|---|---|---|
| 10,856,163 | B2 * | 12/2020 | Kim | H04L 5/001 |
| 11,076,310 | B2 * | 7/2021 | Harada | H04W 72/04 |
| 11,212,716 | B2 * | 12/2021 | Yiu | H04W 76/27 |
| 11,228,954 | B2 * | 1/2022 | Kim | H04W 24/10 |
| 11,246,163 | B2 * | 2/2022 | Cirik | H04W 76/27 |
| 11,546,790 | B2 * | 1/2023 | Jung | H04L 5/0094 |
| 2011/0111765 | A1 | 5/2011 | Yang et al. | |
| 2014/0169258 | A1 | 6/2014 | Futaki et al. | |
| 2014/0177557 | A1 | 6/2014 | Charbit et al. | |
| 2015/0139197 | A1 | 5/2015 | He et al. | |
| 2016/0157117 | A1 | 6/2016 | Pan et al. | |
| 2018/0184415 | A1 | 6/2018 | Rong et al. | |
| 2018/0324617 | A1 | 11/2018 | Schmidt et al. | |
| 2021/0392537 | A1 * | 12/2021 | Da Silva | H04W 76/38 |
| 2022/0110085 | A1 * | 4/2022 | Khoryaev | H04W 74/0833 |
| 2022/0124532 | A1 * | 4/2022 | Rugeland | H04W 76/27 |
| 2022/0150739 | A1 * | 5/2022 | Da Silva | H04W 24/10 |
| 2022/0151000 | A1 * | 5/2022 | Virtej | H04W 24/10 |

FOREIGN PATENT DOCUMENTS

| | | |
|---|---|---|
| EP | 1903820 B1 | 12/2019 |
| WO | 2015164712 A1 | 10/2015 |
| WO | 2018005531 A1 | 1/2018 |
| WO | 2018083369 A1 | 5/2018 |
| WO | 2018236172 A1 | 12/2018 |

OTHER PUBLICATIONS

Nokia, "Enhancing LTE CA utilization", 3GPP TSG RAN meeting #80, RP-181279, Jun. 11-14, 2018, La Jolla, USA.

* cited by examiner

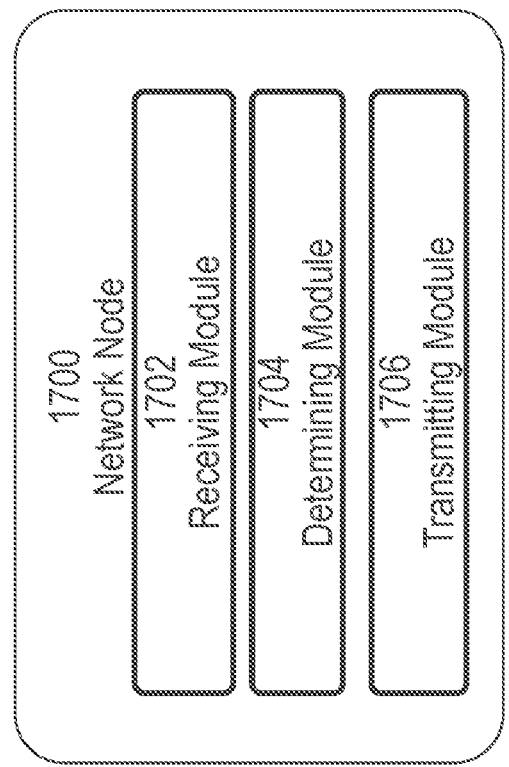
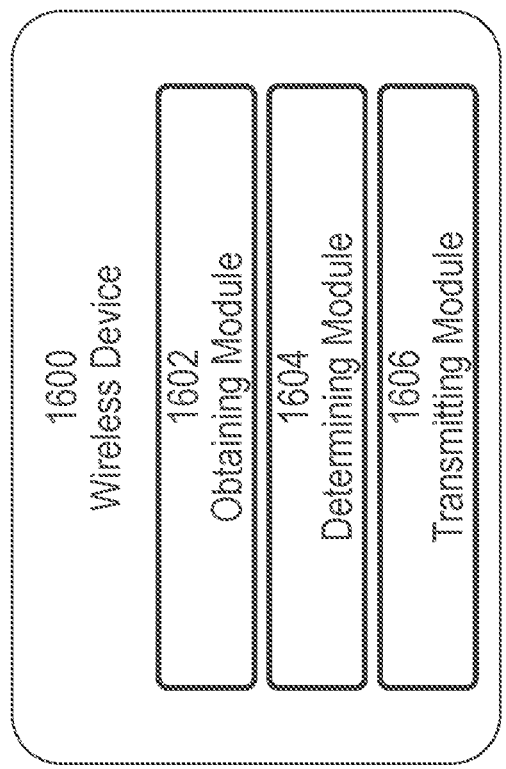
FIG. 11

MEASUREMENTS FOR CARRIER AGGREGATION/DUAL CONNECTIVITY SETUP

RELATED APPLICATIONS

This application is a national stage application of International Patent Application No. PCT/IB2020/051220, filed Feb. 13, 2020, which claims the benefit of and priority to U.S. Provisional Application Ser. No. 62/805,810 entitled "Measurements for Carrier Aggregation/Dual Connectivity Setup," filed Feb. 14, 2019, the disclosures of which are incorporated in their entirety by reference.

TECHNICAL FIELD

Particular embodiments relate to wireless communication, and more specifically to additional information for early measurements and connected mode measurements for effective carrier aggregation (CA) and/or dual connectivity (DC) setup.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Third Generation Partnership Project (3GPP) long term evolution (LTE) includes carrier aggregation (CA) and dual connectivity (DC). LTE Release 10 includes carrier aggregation to enable a user equipment (UE) to transmit/receive information via multiple cells (referred to as Secondary Cells—SCell(s)) from multiple carrier frequencies to the benefit of the existing non-contiguous and contiguous carriers. In CA terminology, the PCell is the cell with which the UE established a radio resource control (RRC) connection or with which the UE performed handover. In CA, cells are aggregated on medium access control (MAC)-level. The MAC receives grants for a cell and multiplexes data from different bearers to one transport block for transmission on that cell. Also, the MAC controls how the process is performed. An example protocol stack is illustrated in FIG. 1.

FIG. 1 is a block diagram illustrating the carrier aggregation protocol stack. The protocol stack includes the packet data convergence protocol (PDCP), radio link control (RLC), and the MAC layer. The MAC layer multiplexes one or more of the PDCP/RLC bearers for transmission to one or more cells.

SCells can be added (i.e., configured) for the UE using RRC signaling (e.g. RRCConnectionReconfiguration), which takes in the order of 100s of milliseconds. A cell that is configured for the UE becomes a serving cell for the UE. An SCell may also be associated to an SCell state. When configured/added via RRC, an SCell starts in a deactivated state. In LTE Rel-15 an eNB can indicate to activate-upon-configuration, or change the state, at least in RRCReconfiguration.

In general, for each each SCell configured for the UE other than the PSCell, if the received RRCConnectionReconfiguration message includes sCellState for the SCell and indicates activated, then configure lower layers to consider the SCell to be in activated state. If the received RRCConnectionReconfiguration message includes sCellState for the SCell and indicates dormant, then configure lower layers to consider the SCell to be in dormant state. Otherwise configure lower layers to consider the SCell to be in deactivated state.

LTE Release 15 includes an intermediate state between the deactivated and active state for enhanced uplink operation. A MAC Control Element (MAC CE) can be used to change the SCell state between the three states. There are also timers in MAC to move a cell between deactivated/activated/dormant. These timers are: (a) sCellHibernationTimer, which moves the SCell from activated state to dormant state; (b) sCellDeactivationTimer, which moves the SCell from activated state to deactivated state; and (c) dormantSCellDeactivationTimer, which moves the SCell from dormant state to deactivated state. The MAC level SCell activation takes on the order of 20-30 ms. An example is illustrated in FIG. 2.

FIG. 2 is an example SCell state diagram. The SCell may transition between deactivated, activated, and dormant states. Moving to a dormant state may be referred to as hibernation.

After the network configures and/or activates CA, the network determines which cells to initially configure and/or activate, if they are configured, and/or whether a cell/carrier is sufficient in terms of radio quality/coverage (e.g., reference signal received power (RSRP) and/or reference signal received quality (RSRQ)). To understand the conditions on SCell(s) or potential SCell(s) in an available carrier, the network may configure the UE to perform radio resource management (RRM) measurements. An example is illustrated in FIG. 3.

FIG. 3 is an example signaling diagram for measurement reporting. Typically, a UE may report RRM measurements to assist the network. The network may configure the UE with measurement IDs associated to reportConfig with event A1 (serving becomes better than threshold) in case the cell is a configured SCell, or A4 (neighbor becomes better than threshold) for carriers without a configured SCell. The measurement objects are associated to the carrier for which the network wants reports. If the network is aware of the exact cells it wants the UE to measure, a white cell list can be configured in the measurement object so that the UE is only required to measure these cells in that carrier.

With the introduction of Dual Connectivity in Rel-12, a UE may be configured with a secondary cell group (SCG). A benefit is that the UE may potentially add a cell from another eNodeB. Regarding the protocol stacks, adding a cell from another eNodeB requires different MAC entities, one for each cell group. The UE has two cell groups, one associated to the PCell (master node) and another associated to a PScell (of the secondary eNodeB), where each group may possibly have their own associated SCells.

For adding SCells, when the UE is in single connectivity, as an example, the RRCConnectionReconfiguration message may carry a cell index (so MAC identifiers are optimized, i.e., shorter), cell identifier and carrier frequency, common parameters, and state information, later introduced in Rel-15 (activated or dormant).

Below is an example RRCConnectionReconfiguration message.

```
SCellToAddModList-r10 ::=        SEQUENCE (SIZE (1..maxSCell-
r10)) OF SCellToAddMod-r10
SCellToAddMod-r10 ::=            SEQUENCE {
    sCellIndex-r10                   SCellIndex-r10,
    cellIdentification-r10           SEQUENCE {
        physCellId-r10                   PhysCellId,
        dl-CarrierFreq-r10               ARFCN-
ValueEUTRA
    }
                                     OPTIONAL,-- Cond SCellAdd
    radioResourceConfigCommonSCell-r10
        RadioResourceConfigCommonSCell-r10 OPTIONAL, --   Cond
SCellAdd
    radioResourceConfigDedicatedSCell-r10
        RadioResourceConfigDedicatedSCell-r10   OPTIONAL, --   Cond
SCellAdd2
    ...,
    [[      dl-CarrierFreq-v1090             ARFCN-
ValueEUTRA-v9e0        OPTIONAL -- Cond EARFCN-max
    ]],
    [[      antennaInfoDedicatedSCell-v10i0
        AntennaInfoDedicated-v10i0       OPTIONAL -- Need ON
    ]],
    [[      srs-SwitchFromServCellIndex-r14    INTEGER (0..
31) OPTIONAL -- Need ON
    ]],
    [[      sCellState-r15                   ENUMERATED
{activated, dormant}        OPTIONAL -- Need ON
    ]]
}
```

| RRCConnectionReconfiguration field descriptions |
| --- |
| sCellConfigCommon<br>Indicates the common configuration for the SCell group.<br>sCellGroupIndex<br>Indicates the identity of SCell groups for which a common configuration is provided.<br>sCellIndex<br>In case of DC, the SCellIndex is unique within the scope of the UE i.e. an SCG cell cannot use the same value as used for an MCG cell. For pSCellToAddMod, if sCellIndex-r13 is present the UE shall ignore sCellIndex-r12. sCellIndex-r13 in sCellToAddModListExt-r13 shall not have same values as sCellIndex-r10 in sCellToAddModList-r10.<br>sCellGroupToAddModList, sCellGroupToAddModListSCG<br>Indicates the SCell group to be added or modified. E-UTRAN only configures at most 4 SCell groups per UE over all cell groups.<br>sCellGroupToReleaseList<br>Indicates the SCell group to be released.<br>sCellState<br>A one-shot field that indicates whether the SCell shall be considered to be in activated or dormant state upon SCell configuration.<br>sCellToAddModList, sCellToAddModListExt<br>Indicates the SCell to be added or modified. Field sCellToAddModList is used to add the first 4 SCells for a UE with sCellIndex-r10 while sCellToAddModListExt is used to add the rest. If E-UTRAN includes sCellToAddModListExt-v1430 it includes the same number of entries, and listed in the same order, as in sCellToAddModListExt-r13. If E-UTRAN includes sCellToAddModList-v1010 it includes the same number of entries, and listed in the same order, as in sCellToAddModList-r10. If E-UTRAN includes sCellToAddModListExt-v1370 it includes the same number of entries, and listed in the same order, as in sCellToAddModListExt-r13. If E-UTRAN includes sCellToAddModListExt-v13c0 it includes the same number of entries, and listed in the same order, as in sCellToAddModListExt-r13.<br>sCellToAddModListSCG, sCellToAddModListSCG-Ext<br>Indicates the SCG cell to be added or modified. The field is used for SCG cells other than the PSCell (which is added/modified by field pSCellToAddMod). Field sCellToAddModListSCG is used to add the first 4 SCells for a UE with sCellIndex-r10 while sCellToAddModListSCG-Ext is used to add the rest. If E-UTRAN includes sCellToAddModListSCG-v1010 it includes the same number of entries, and listed in the same order, as in sCellToAddModListSCG-r12. If E-UTRAN includes sCellToAddModListSCG-Ext-v1370 it includes the same number of entries, and listed in the same order, as in sCellToAddModListSCG-Ext-r13. If E-UTRAN includes sCellToAddModListSCG-Ext-v13c0 it includes the same number of entries, and listed in the same order, as in sCellToAddModListSCG-Ext-r13.<br>sCellToReleaseListSCG, sCellToReleaseListSCG-Ext<br>Indicates the SCG cell to be released. The field is also used to release the PSCell e.g. upon change of PSCell, upon system information change for the PSCell. |

The procedure to add SCells to the MCG in LTE (or to modify) is described in 3GPP TS 36.331.

3GPP fifth generation (5G) includes both a new core network (5GC) and a new radio access network (NR). The core network, 5GC, also supports other RATs than NR. LTE (or E-UTRA) may also be connected to 5GC. LTE base stations (eNBs) that are connected to 5GC are referred to as ng-eNB and are part of NG-RAN which also consist of NR base stations referred to as gNBs. FIG. 4 illustrates how the base stations are connected to each other and the nodes in 5GC.

FIG. 4 is a block diagram illustrating the 5GC and NG-RAN architecture. The 5GC includes the access and mobility function (AMF) and user plane function (UPF). The NG-RAN includes one or more gNB and ng-eNB. The gNB and ng-eNB are connected to the 5GC via NG interfaces. The gNB and ng-eNB are connected to each other via Xn interfaces.

A 5G network may be deployed in various ways with or without interworking with LTE (also referred to as E-UTRA) and evolved packet core (EPC), as depicted in FIG. 5. In some examples, NR and LTE can be deployed without any interworking, denoted by NR stand-alone (SA) operation. The gNB in NR can be connected to the 5G core network (5GC) and eNB can be connected to EPC with no interconnection between the two (Option 1 and Option 2 in FIG. 5).

In another example, the first supported version of NR is referred to as EN-DC (E-UTRAN-NR dual connectivity), illustrated by Option 3 in FIG. 5. In such a deployment, dual connectivity between NR and LTE is applied with LTE as the master and NR as the secondary node. The RAN node (gNB) supporting NR may not have a control plane connection to the core network (EPC) and instead relies on the LTE as master node (MeNB). This is also referred to as "Non-standalone NR." In this case the functionality of an NR cell is limited and is used for connected mode UEs as a booster and/or diversity leg, but an RRC_IDLE UE cannot camp on these NR cells.

With the introduction of 5GC, other options may be also valid. As described above, Option 2 supports stand-alone NR deployment where gNB is connected to 5GC. Similarly, LTE can also be connected to 5GC using Option 5 (also referred to as eLTE, E-UTRA/5GC, or LTE/5GC, and the node can be referred to as an ng-eNB). In these cases, both NR and LTE are seen as part of the NG-RAN (and both the ng-eNB and the gNB can be referred to as NG-RAN nodes).

Option 4 and Option 7 are other variants of dual connectivity between LTE and NR which may be standardized as part of NG-RAN connected to 5GC, denoted by MR-DC (Multi-Radio Dual Connectivity). The MR-DC family includes the following examples. For EN-DC (Option 3), LTE is the master node and NR is the secondary (EPC CN employed). For NE-DC (Option 4), NR is the master node and LTE is the secondary (5GCN employed). For NGEN-DC (Option 7), LTE is the master node and NR is the secondary (5GCN employed). NR-DC (variant of Option 2) includes dual connectivity where both the master and secondary are NR (5GCN employed).

As migration for these options may differ from different operators, it is possible to have deployments with multiple options in parallel in the same network. For example, an eNB base station may support Option 3, 5 and 7 in the same network as an NR base station supporting Options 2 and 4. In combination with dual connectivity solutions between LTE and NR, some examples support carrier aggregation in each cell group (i.e., MCG and SCG) and dual connectivity between nodes on the same RAT (e.g., NR-NR DC). For the LTE cells, a consequence of the different deployments is the co-existence of LTE cells associated to eNBs connected to EPC, 5GC or both EPC/5GC.

In these networks, a typical scenario/use case is a UE with some burst traffic that comes and goes. For example, a UE may transmit/receive some video packets, then have idle periods of transmission/reception, and then transmits/receives again. To save UE power, the network may transition the UE from connected to idle between the transmission/reception periods. Later the UE may access the network again (either via paging or UE connection request).

LTE Rel-13 includes the ability for the network to suspend a UE in a suspended state similar to RRC_IDLE but with the difference that the UE stores the access stratum (AS) context or RRC context. This facilitates a reduction in signaling when the UE is becoming active again by resuming the RRC connection, instead of establishing the RRC connection from scratch as done previously.

Reducing the signaling has several benefits, such as reducing latency e.g. for smart phones accessing Internet. Reduced signaling leads to reduced battery consumption for machine type devices sending very little data.

In the Rel-13 solution, the UE sends a RRCConnectionResumeRequest message to the network and in response may receive an RRCConnectionResume from the network. The RRCConnectionResume is not encrypted but integrity protected.

The resume procedure in LTE can be found in the RRC specifications (3GPP TS 36.331). Because the UE performing resume is in RRC_IDLE (with suspended AS context), it triggers a transition from RRC_IDLE to RRC_CONNECTED. Thus, the transition is modelled in the specifications in the same subclause that captures the RRC connection establishment (subclause 5.3.3 RRC connection establishment).

The SCG configurations and SCell configurations for MCGs are relevant in relation to suspend/resume procedures. Upon suspension, the UE stores its used RRC configuration. If the UE is operating in a dual connectivity mode (and has a n SCG configuration) or just having configured SCells in the MCG, the UE stores these configurations. However, upon resume, at least until Rel-15, the UE releases the SCG configurations and SCell configurations.

Thus, when the UE comes from RRC_IDLE with the context, if the network wants to add SCell(s) to the MCG or add an SCG, the network needs to do that from scratch, even if the UE is suspending and resuming in the same cell/area where the previous PCell and SCell configurations are still valid from a radio conditions perspective.

Because UEs with burst traffic constantly being suspended and resuming in the same cell is typical, 3GPP has standardized a solution in LTE to enable the UE to assist the network with measurements performed while the UE is in RRC_IDLE so that the network can speed up the setup of carrier aggregation or dual connectivity. The solution includes early measurement.

In LTE Rel-15, a UE may report early measurements upon the transition from idle to connected state. The measurements are measurements that the UE performs in idle state, and according to a configuration provided by the source cell. The source cell receives the measurements after the UE is connected and can quickly setup CA and/or other forms of DC (e.g., EN-DC, MR-DC, etc.) without first providing a measurement configuration (measConfig) in RRC_CONNECTED, as described with respect to FIG. 3, and wait for hundreds of milliseconds until first samples are collected, monitored and then the first reports are triggered and transmitted to the network.

A first aspect of the existing solution, as standardized in EUTRA 36.331, is described in Section 5.6.20 Idle Mode Measurements. The UE receives the idle mode measurement configurations in the system information (SIBS) in the field MeasIdleConfigSIB-r15, indicating up to 8 cells or ranges of cell IDs to measure. In addition, the UE may be configured upon the transition from RRC_CONNECTED to RRC_IDLE with a dedicated measurement configuration in the RRCConnectionRelease message with the measIdleDedicated-r15 which overrides the broadcasted configurations in SIBS. The broadcasted and dedicated signaling is shown below.

RRCConnectionRelease message

```
-- ASN1START
RRCConnectionRelease ::=           SEQUENCE {
    rrc-TransactionIdentifier          RRC-TransactionIdentifier,
    criticalExtensions                 CHOICE {
        c1                                 CHOICE
{
            rrcConnectionRelease-r8        RRCConnectionRelease-r8-IEs,
            spare3 NULL, spare2 NULL, spare1 NULL
        },
        criticalExtensionsFuture           SEQUENCE { }
    }
}
-- other info has been omitted
RRCConnectionRelease-v1530-IEs ::= SEQUENCE {
    drb-ContinueROHC-r15               ENUMERATED {true}
        OPTIONAL, -- Cond UP-EDT
    nextHopChainingCount-r15           NextHopChainingCount
        OPTIONAL, -- Cond UP-EDT
    measIdleConfig-r15
    MeasIdleConfigDedicated-r15        OPTIONAL, -- Need ON
    rrc-InactiveConfig-r15                 RRC-
InactiveConfig-r15     OPTIONAL, -- Need OR
    cn-Type-r15                        ENUMERATED
{epc,fivegc}        OPTIONAL, -- Need OR
    nonCriticalExtension               SEQUENCE { }
        OPTIONAL
}
-- ASN1STOP
        MeasIdleConfig information element
-- ASN1START
MeasIdleConfigSIB-r15 ::= SEQUENCE {
    measIdleCarrierListEUTRA-r15   EUTRA-CarrierList-r15,
    ...
}
MeasIdleConfigDedicated-r15 ::= SEQUENCE {
    measIdleCarrierListEUTRA-r15   EUTRA-CarrierList-r15
        OPTIONAL, -- Need OR
    measIdleDuration-r15           ENUMERATED {sec10, sec30,
sec60, sec120,
        sec180, sec240, sec300, spare},
    ...
}
EUTRA-CarrierList-r15 ::= SEQUENCE (SIZE (1..maxFreqIdle-r15))
OF MeasIdleCarrierEUTRA-r15
MeasIdleCarrierEUTRA-r15::=         SEQUENCE {
    carrierFreq-r15                    ARFCN-ValueEUTRA-r9,
    allowedMeasBandwidth-r15           AllowedMeasBandwidth,
    validityArea-r15                   CellList-r15
        OPTIONAL, -- Need OR
    measCellList-r15                   CellList-r15
        OPTIONAL, -- Need OR
    reportQuantities                   ENUMERATED {rsrp,
rsrq, both},
    qualityThreshold-r15               SEQUENCE {
        idleRSRP-Threshold-r15             RSRP-Range
            OPTIONAL, -- Need OR
```

RRCConnectionRelease message
-continued

```
        idleRSRQ-Threshold-r15             RSRQ-Range-
r13                OPTIONAL -- Need OR
    }
                                       OPTIONAL, -- Need OR
    ...
}
CellList-r15 ::=                   SEQUENCE (SIZE (1.. maxCellMeasIdle-
r15)) OF PhysCellIdRange
-- ASN1STOP
```

MeasIdleConfig field descriptions allowedMeasBandwidth
If absent, the value corresponding to the downlink bandwidth indicated by the dl-Bandwidth included in MasterInformationBlock of serving cell applies.
carrierFreq
Indicates the E-UTRA carrier frequency to be used for measurements during IDLE mode.
measIdleCarrierListEUTRA
Indicates the E-UTRA carriers to be measured during IDLE mode.
measIdleDuration
Indicates the duration for performing measurements during IDLE mode for measurements assigned via RRCConnectionRelease. Value sec 10 correspond to 10 seconds, value sec 30 to 30 seconds and so on.
qualityThreshold
Indicates the quality thresholds for reporting the measured cells for IDLE mode measurements.
reportQuantities
Indicates which measurement quantities UE is requested to report in the IDLE mode measurement report.
measCellList
Indicates the list of cells which the UE is requested to measure and report for IDLE mode measurements.
validityArea
Indicates the list of cells within which UE is requested to do IDLE mode measurements. If the UE reselects to a cell outside this list, the measurements are no longer required.

The UE may be provided a list of carriers and optionally with a list of cells that the UE shall measure. The fields s-NonIntraSearch in SystemInformationBlockType3 do not affect the UE measurement procedures in IDLE mode.

Upon the reception of the measurement configuration, the UE starts a timer T331 with the value provided in measIdleDuration, which can range from 0 to 300 seconds. The timer stops upon receiving RRCConnectionSetup or RRCConnectionResume, which indicates a transition to RRC_CONNECTED. The timer limits the amount of time the UE perform measurements for purpose of early measurements.

LTE also includes a validity area, which comprises a list of physical cell identifiers (PCIs). The validity area limits the area where CA or DC may be setup later when the UE resumes/setups the connection, so that the early measurements are useful for that purpose. If validityArea is configured, and the UE reselects to a serving cell whose PCI does not match an entry in validityArea for the corresponding carrier frequency, the timer T331 is stopped and the UE stops performing IDLE measurements and releases the configuration (e.g., VarMeasIdleConfig). This does not necessarily mean that the UE releases the idle measurements that were configured and performed. The measurements may still be stored and possibly requested by the network. In addition, the UE may continue with IDLE mode measurements according to the broadcasted SIBS configuration after the timer T331 has expired or stopped.

Some implementation include a minim quality threshold. For example, only measurements above a certain threshold may be stored because the cell candidates for CA setup need to be within a minimum acceptable threshold. How the UE performs measurements in IDLE mode is up to UE implementation as long as RAN4 requirements for measurement reporting defined in 36.133 are met.

The UE early measurement behavior is described in more detail in 3GPP 36.331 Section 5.6.20, which specifies the measurements done by a UE in RRC_IDLE when it has an IDLE mode measurement configuration and the storage of the available measurements by a UE in both RRC_IDLE and RRC_CONNECTED.

Another aspect of the existing solution occurs when the UE tries to resume or setup a call from RRC_IDLE without context. If the previous step is performed, i.e., if the UE is configured to store idle measurements, the network may inquire whether the UE after resume/setup (after security is activated) has idle measurements available.

If the UE is setting up a connection coming from RRC_IDLE without the AS Context, the network is not aware that the UE has available measurements stored. To enable the network to know that, and possibly request the UE to report early measurements, the UE may indicate the availability of stored idle measurements in RRCConnectionSetupComplete. As not all cells support the feature, the UE may only include the availability information if the cell broadcasts in SIB2 the idleModeMeasurements indication. The flag in RRCReconnectionSetupComplete is shown below:

the cell broadcasts in SIB2 the idleModeMeasurements indication. The flag in RRCReconnectionResumeComplete is shown below:

```
RRCConnectionResumeComplete-v1530-IEs ::= SEQUENCE {
    logMeasAvailableBT-r15          ENUMERATED {true}     OPTIONAL,
    logMeasAvailableWLAN-r15   ENUMERATED {true}     OPTIONAL,
    idleMeasAvailable-r15           ENUMERATED {true}     OPTIONAL,
    flightPathIntoAvailable-r15    ENUMERATED {true}     OPTIONAL,
    nonCriticalExtension            SEQUENCE { }          OPTIONAL
}
```

After the UE indicates to the target cell upon resume or setup that idle measurements are available, the network may request the UE to report the available measurements by including the field idleModeMeasurementReq in the UEInformationRequest message transmitted to the UE. The UE responds with a UEInformationResponse containing these measurements. An example is illustrated in FIG. 6.

Upon receiving the UEInformationRequest message, the UE, after successful security activation, performs the following steps. If the idleModeMeasurementReq is included in the UEInformationRequest and UE has stored VarMeasIdleReport, then the UE sets the measResultListIdle in the

```
RRCConnectionSetupComplete-v1530-IEs ::= SEQUENCE {
    logMeasAvailableBT-r15            ENUMERATED {true}
                    OPTIONAL,
    logMeasAvailableWLAN-r15     ENUMERATED {true}
                    OPTIONAL,
    idleMeasAvailable-r15              ENUMERATED {true}
                    OPTIONAL,
    flightPathInfoAvailable-r15       ENUMERATED {true}
                    OPTIONAL,
    connectTo5GC-r15                   ENUMERATED {true}
                    OPTIONAL,
    registeredAMF-r15                  RegisteredAMF-r15
                    OPTIONAL,
    s-NSSAI-list-r15                   SEQUENCE(SIZE
 (1..maxNrofS-NSSAI-r15)) OF S-NSSAI-r15 OPTIONAL,
    ng-5G-S-TMSI-Bits-r15              CHOICE {
        ng-5G-S-TMSI-r15                   NG-5G-S-
TMSI-r15,
        ng-5G-S-TMSI-Part2-r15             BIT STRING
 (SIZE (8))
    }
                    OPTIONAL,
    nonCriticalExtension
    RRCConnectionSetupComplete-v1540-IEs      OPTIONAL
}
```

If the UE is setting up a connection coming from RRC_IDLE but with a stored AS context (e.g., resume from suspended), the network may be aware that the UE may have available idle measurements stored after checking the fetched context from the source node where the UE was suspended. However, it is still not certain that the UE has measurements available because the UE is only required to perform the measurements if the cells are above the configured RSRP/RSRQ thresholds and while it performs cell selection/cell reselection within the configured validity area. To enable the network to know that, and possibly request the UE to report early measurements, the UE may also indicate the availability of stored idle measurements in RRCConnectionResumeComplete. As not all cells support the feature, the UE may only include the availability information if UEInformationResponse message to the value of idleMeasReport in the VarMeasIdleReport and discards the VarMeasIdleReport upon successful delivery of the UEInformationResponse message confirmed by lower layers.

UEInformationResponse message

```
-- ASN1START
UEInformationResponse-r9 ::=    SEQUENCE {
    rrc-TransactionIdentifier     RRC-TransactionIdentifier,
    criticalExtensions            CHOICE {
        c1                            CHOICE {
            ueInformationResponse-r9
            UEInformationResponse-r9-IEs,
```

-continued

| UEInformationResponse message |
|---|
|       spare3 NULL, spare2 NULL, spare1 NULL<br>    },<br>      criticalExtensionsFuture              SEQUENCE { }<br>    }<br>}<br>UEInformationResponse-v1530-IEs ::= SEQUENCE {<br>    measResultListIdle-r15<br>    MeasResultListIdle-r15        OPTIONAL,<br>    flightPathInfoReport-r15      FlightPathInfoReport-r15    OPTIONAL, nonCriticalExtension<br>    SEQUENCE { }                   OPTIONAL<br>} |

Buffer status reports (BSRs) are used for requesting UL-SCH resources when a UE needs to send new data. Essentially, there are 8 buffers in the MAC entity of a UE in NR (and 4 buffers in LTE). Each one can store data/traffic for a group of logical channels (referred to as a logical channel group (LCG)) depending on the mapping configuration. The mapping of a logical channel to an LCG is done at the time when the logical channel is setup by the gNB, which may be based on QoS profile of the channel. Responding to BSR, the network (gNB) may grant uplink radio resources to the UE for transmitting the queued data. The radio resource granted to the UE may be used to transmit data from one or more logical channel depending on the priorities of the logical channels.

There are three types of BSR: regular BSR, periodic BSR, and padding BSR. Each one has different triggering conditions. A regular BSR is triggered if the MAC entity has new uplink data available for a logical channel that belongs to an LCG and either the new uplink data belongs to a logical channel with higher priority than the priority of any logical channel containing available UL data which belong to any LCG or none of the logical channels that belong to an LCG contains any available uplink data. A padding BSR is triggered if UL resources are allocated and a number of padding bits is equal to or larger than the size of the BSR MAC CE plus its sub-header. A periodic BSR is triggered periodically based on a timer referred to as periodicBSR-Timer.

The Buffer Size field includes the total amount of data available and is calculated as specified in 3GPP TS 38.322 and TS 38.323, across all logical channels of a logical channel group after the MAC protocol data unit (PDU) has been built i.e. after the logical channel prioritization procedure.

There currently exist certain challenges. When the UE is resuming the connection from a dormant state (e.g., RRC_IDLE with UE AS context or from RRC_INACTIVE), the UE may do so for a variety of reasons (e.g., mobile originating (MO) signaling, data, voice or video, or mobile terminated (MT) signaling, data, emergency call or RNA update, etc.). The request to resume a suspended connection (or to setup an idle connection) is typically modelled as an interaction from the non-access stratum (NAS) layer and the access stratum (AS) layer, and it is also the NAS layer that sets the cause value, except in the case of a RAN area update (which is triggered by AS). In the case of resume, the cause is included in the RRC Resume Request like message as a cause value, as shown below:

| |
|---|
| ResumeCause ::=             ENUMERATED {emergency, highPriorityAccess, mt-Access, mo-Signalling, mo-Data, mo-VoiceCall, mo-VideoCall, mo-SMS, rna-Update, mps-PriorityAccess, mcs-PriorityAccess, spare1, spare2, spare3, spare4, spare5 } |

For some resume causes, the highest priority is to quickly access the network but with very little bandwidth requirement, e.g. ma-Update and possible mt-Access or mo-SMS. For other causes, the highest priority is to maximize the bandwidth after the UE has entered RRC_CONNECTED, e.g. mo-Data. However, even if the UE signals mo-Data in the resume request message, the UE may only have a small amount of data to transmit, e.g. in case of keep-alive signaling from mobile applications.

LTE Rel-15, includes an early data transmission (EDT) feature. Therein, the dormant UE transmits a specific preamble (configured in system information) to indicate that it has small data to transmit, so that the network provides a larger uplink grant in the random-access response. However, when the UE does not use EDT, i.e., when data is larger or very large, the network does not know the level of data expected from the UE.

With the current information reported in RRC Resume Request/RRC Setup Request, when the request to resume originates in the UE, the network is not be able to discern how much bandwidth the UE requires and might, which may result in problems. For example, the network may configure CA and/or DC even if the UE does not need it. This is inefficient in terms of network resource usage and UE energy consumption (e.g., the UE uses multiple transceivers and perform monitoring/measuring of multiple carriers, etc.). As another example, the network may not configure CA or/and DC is not configured even if the UE would have benefited from it. This may result in UE performance degradation because not enough resources are allocated to accommodate the needs of the UE's traffic.

SUMMARY

As described above, certain challenges currently exist with configuring carrier aggregation (CA) and/or dual connectivity (DC) when a user equipment (UE) resumes from a dormant state. Certain aspects of the present disclosure and their embodiments may provide solutions to these or other challenges.

For example, particular embodiments comprise a method at a UE. During a transition to a connected state, a UE sends an indication of early measurements report availability or the transmission of the report of early measurements performed in RRC_IDLE or dormant state (e.g., RRC_IDLE with UE context or RRC_INACTIVE).

When indicating to the network the availability of early measurements, the UE may include additional information related to the UE's requested traffic/service (examples of information may be a buffer Status, any other service related information from upper layer like a particular application being used, expected traffic in the downlink, etc.).

When reporting to the network the early measurements performed while the UE is in a dormant state, the UE may include additional information related to the UE's requested traffic/service (examples of information may be, a Buffer Status, any other service related information from upper layer like a particular application being used, expected traffic in the downlink, etc.).

According to some embodiments, a method performed by a wireless device comprises: determining a characteristic of data for transmission between the wireless device and a network node; determining the wireless device is configured to send measurement information to the network node; and transmitting an indication of the determined characteristic of data for transmission to the network node with the measurement information.

In particular embodiments, the measurement information comprises an indication that measurements are available or a measurement report.

In particular embodiments, the measurement information comprises early measurement information for early measurements performed during a dormant state, and transmitting the measurement information to the network node comprises transmitting the measurement information during a transition to a connected state. The dormant state may comprise one of RRC_IDLE and RRC_INACTIVE, and the connected state may comprise RRC_CONNECTED. The measurement information may comprise measurement information for measurements performed during a connected state and transmitting the measurement information to the network node may comprise transmitting the measurement information during the connected state.

In particular embodiments, transmitting the indication of the characteristic of data for transmission and the measurement information to the network node comprises including the indication of the characteristic of data and the measurement information in one of a radio resource control (RRC) resume complete, RRC connection resume complete, RRC setup complete, RRC connection setup complete, RRC setup request, RRC connection request, user equipment information response, measurement report, random access request, and security mode command complete message.

In particular embodiments, the method further comprises obtaining a configuration instructing the wireless device to report the indication of the characteristics of data for transmission to the network node with the measurement information. Obtaining the configuration may comprise receiving any one of the following from the network node: a message received prior to entering a dormant state; a message received during a transition from a dormant state to a connected state; and a message received via broadcast information.

In particular embodiments, the determined characteristic of data for transmission comprises at least one of a buffer status, a type of data, a quality of service profile, expected downlink traffic size, and a type of service.

According to some embodiments, a wireless device comprises processing circuitry operable to perform any of the wireless device methods described above.

According to some embodiments, a method performed by a network node comprises: receiving, from a wireless device, an indication of a characteristic of data for transmission between the wireless device and the network node and measurement information; and based on the characteristic of data for transmission between the wireless device and the network node, determining whether to configure the wireless device for operation in dual connectivity or carrier aggregation.

In particular embodiments, the measurement information comprises an indication that measurements are available or a measurement report.

In particular embodiments, the measurement information comprises early measurement information for early measurements performed during a dormant state of the wireless device, and receiving the measurement information comprises receiving the measurement information during a transition of the wireless device to a connected state. The dormant state may comprise one of RRC_IDLE and RRC_INACTIVE, and the connected state may comprise RRC_CONNECTED. The measurement information may comprise measurement information for measurements performed during a connected state of the wireless device and receiving the measurement information may comprise receiving the measurement information during the connected state of the wireless device.

In particular embodiments, receiving the indication of the characteristic of data for transmission and the measurement information comprises receiving the indication of the characteristic of data and the measurement information in one of a RRC resume complete, RRC connection resume complete, RRC setup complete, RRC connection setup complete, RRC setup request, RRC connection request, user equipment information response, measurement report, random access request, and security mode command complete message.

In particular embodiments, the method further comprises transmitting, to the wireless device, a configuration instructing the wireless device to report the indication of the characteristics of data for transmission to the network node with the measurement information. Transmitting the configuration may comprise transmitting any one of the following: a message transmitted prior to the wireless device entering a dormant state; a message transmitted during a transition of the wireless device from a dormant state to a connected state; and a message transmitted via broadcast information.

In particular embodiments, the determined characteristic of data for transmission comprises at least one of a buffer status, a type of data, a quality of service profile, expected downlink traffic size, and a type of service.

According to some embodiments, a network node comprises processing circuitry operable to perform any of the network node methods described above.

Also disclosed is a computer program product comprising a non-transitory computer readable medium storing computer readable program code, the computer readable program code operable, when executed by processing circuitry to perform any of the methods performed by the wireless device described above.

Another computer program product comprises a non-transitory computer readable medium storing computer readable program code, the computer readable program code operable, when executed by processing circuitry to perform any of the methods performed by the network node described above.

Certain embodiments may provide one or more of the following technical advantages. For example, in particular embodiments the network has information to determine whether a UE may benefit from additional bandwidth available from CA and/or DC configurations. In one example, even if the measurement results are favorable, if the UE does not have much data to transmit/receive, it will be a waste of network resources and UE battery power to configure CA/DC. In another example, where the UE has sent an indication of the early measurement report along with additional traffic information, the network may determine that the UE will not benefit from CA/DC (e.g., expected data too low, only best effort traffic, etc.) and not ask for the measurement report (and thereby save unnecessary signaling).

BRIEF DESCRIPTION OF THE DRAWINGS

For a more complete understanding of the disclosed embodiments and their features and advantages, reference is now made to the following description, taken in conjunction with the accompanying drawings, in which:

FIG. 11 illustrates a schematic block diagram of a wireless device and network node in a wireless network, according to certain embodiments;

DETAILED DESCRIPTION

Figure 1:
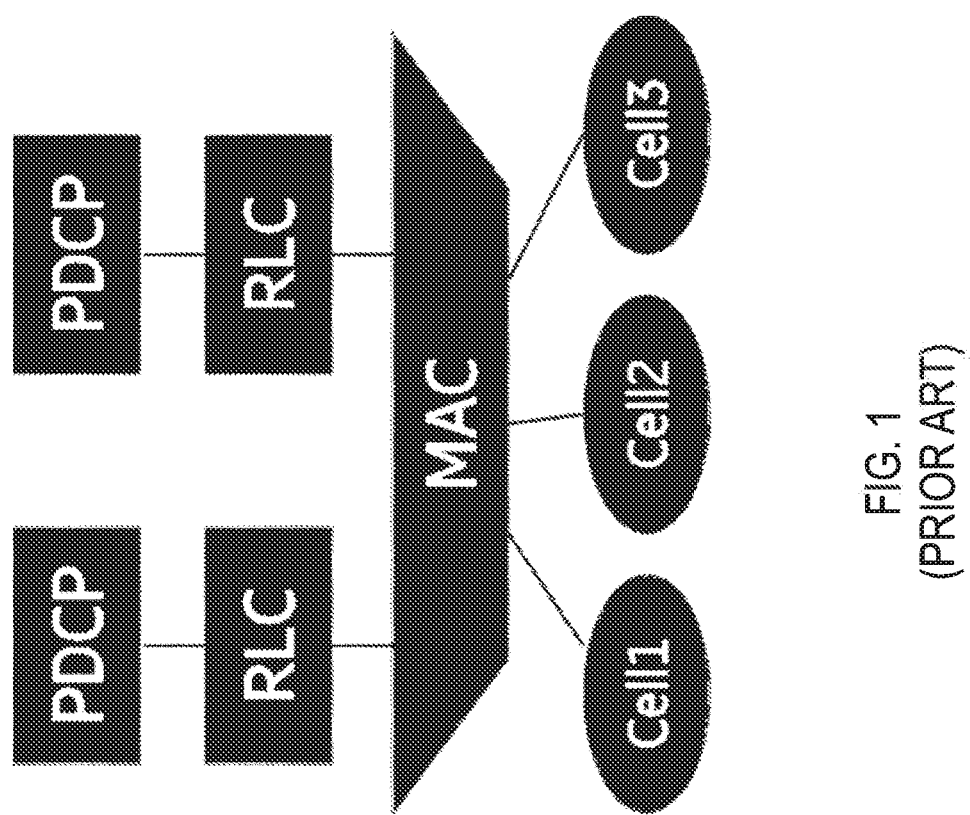
FIG. 1 is a block diagram illustrating the carrier aggregation protocol stack.
Figure 2:
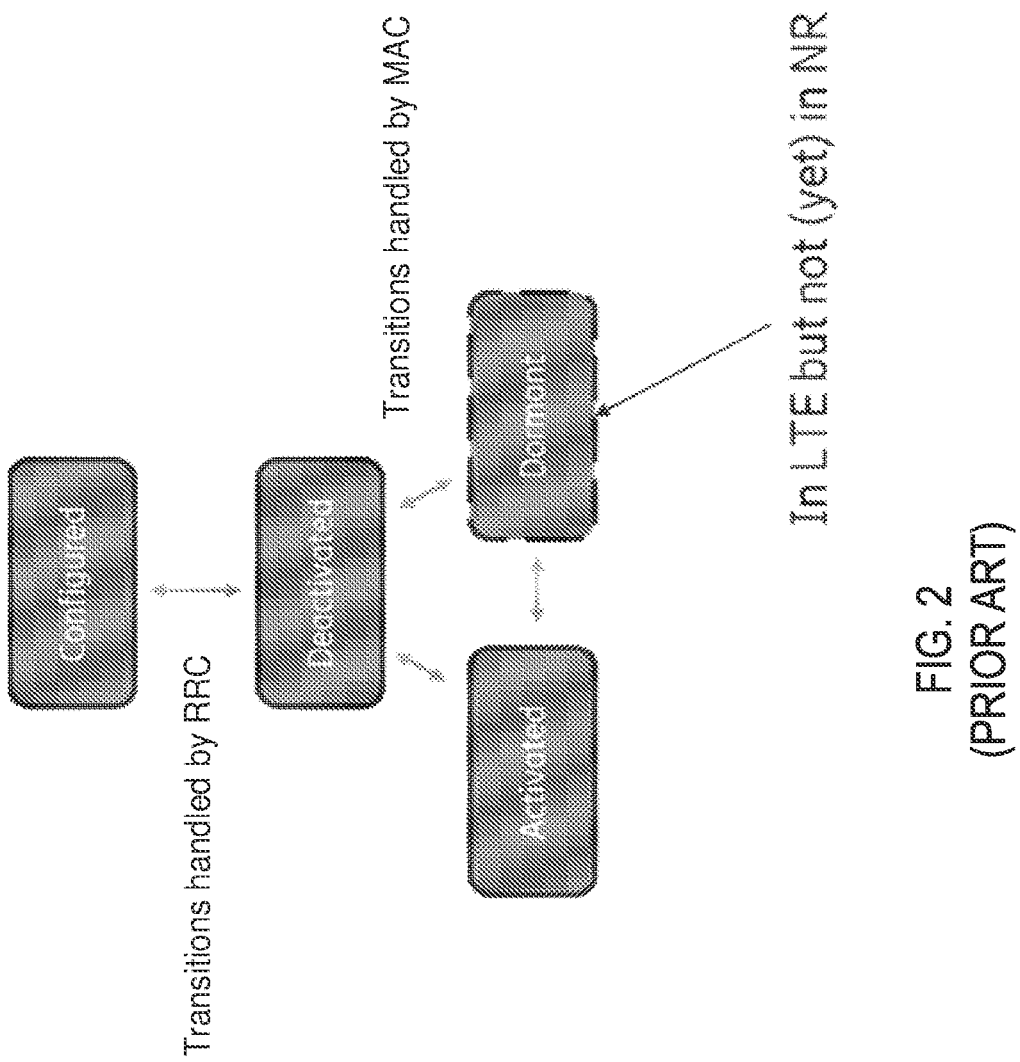
FIG. 2 is an example SCell state diagram.
Figure 3:
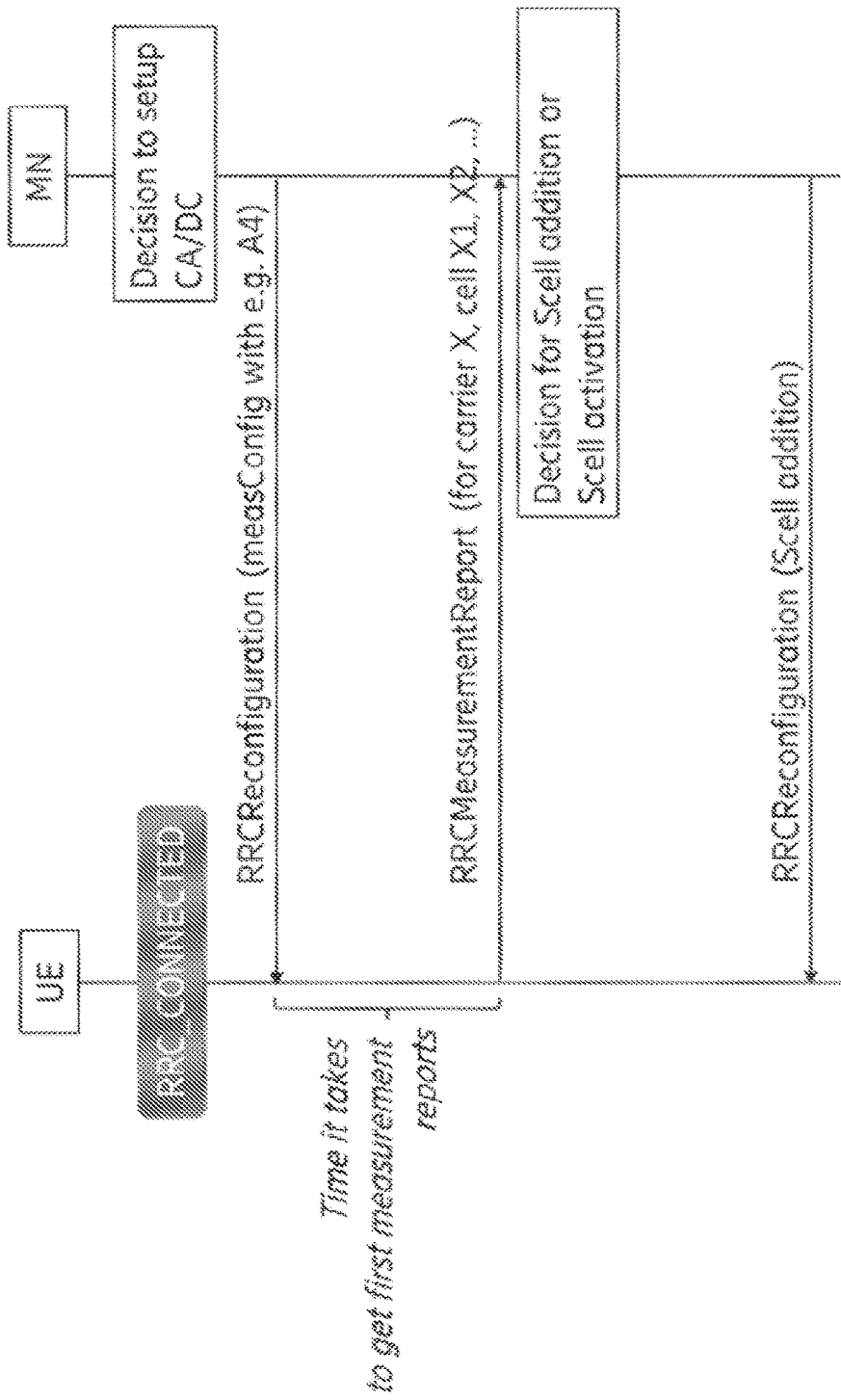
FIG. 3 is an example signaling diagram for measurement reporting.
Figure 4:
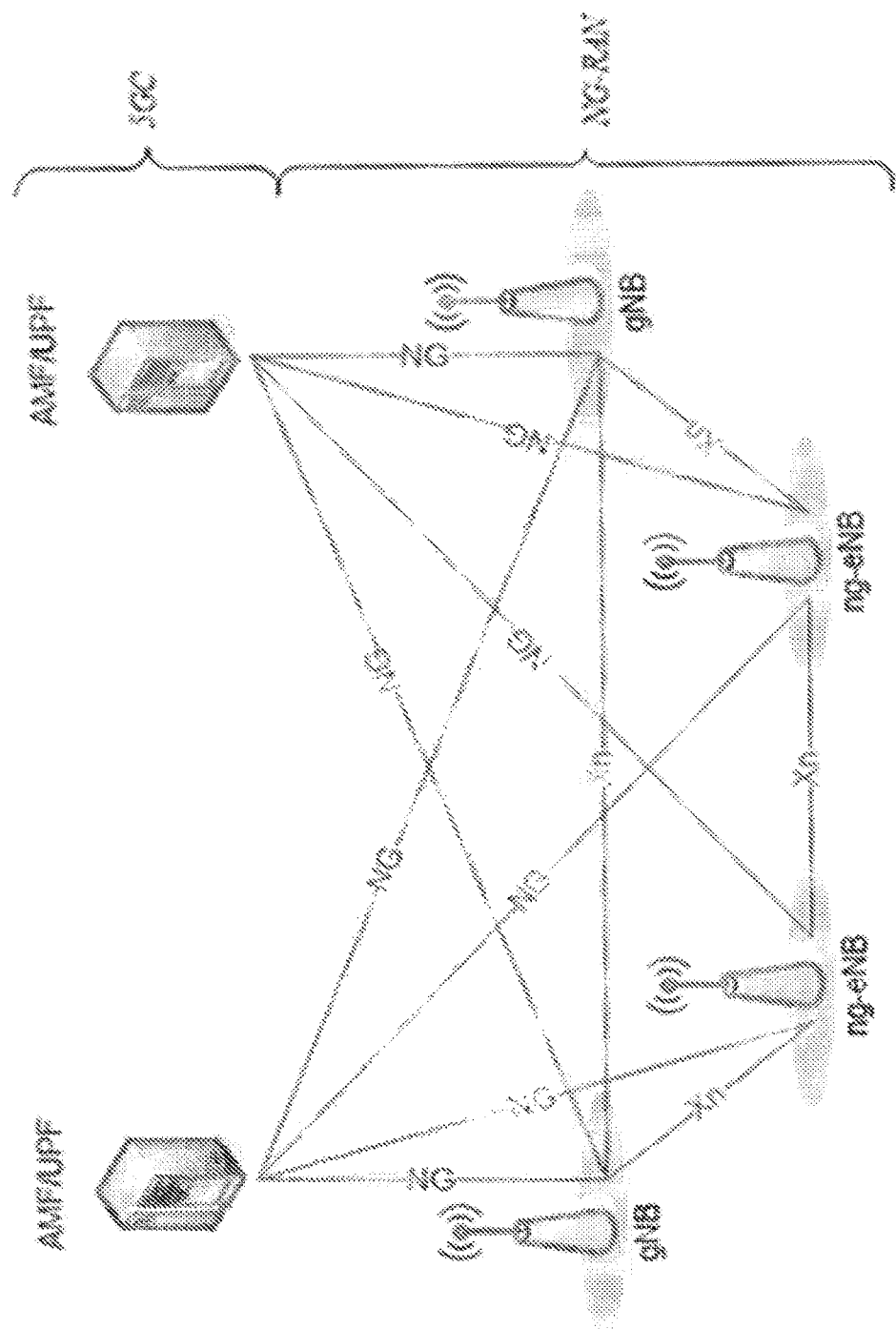
FIG. 4 is a block diagram illustrating the 5GC and NG-RAN architecture.
Figure 5:
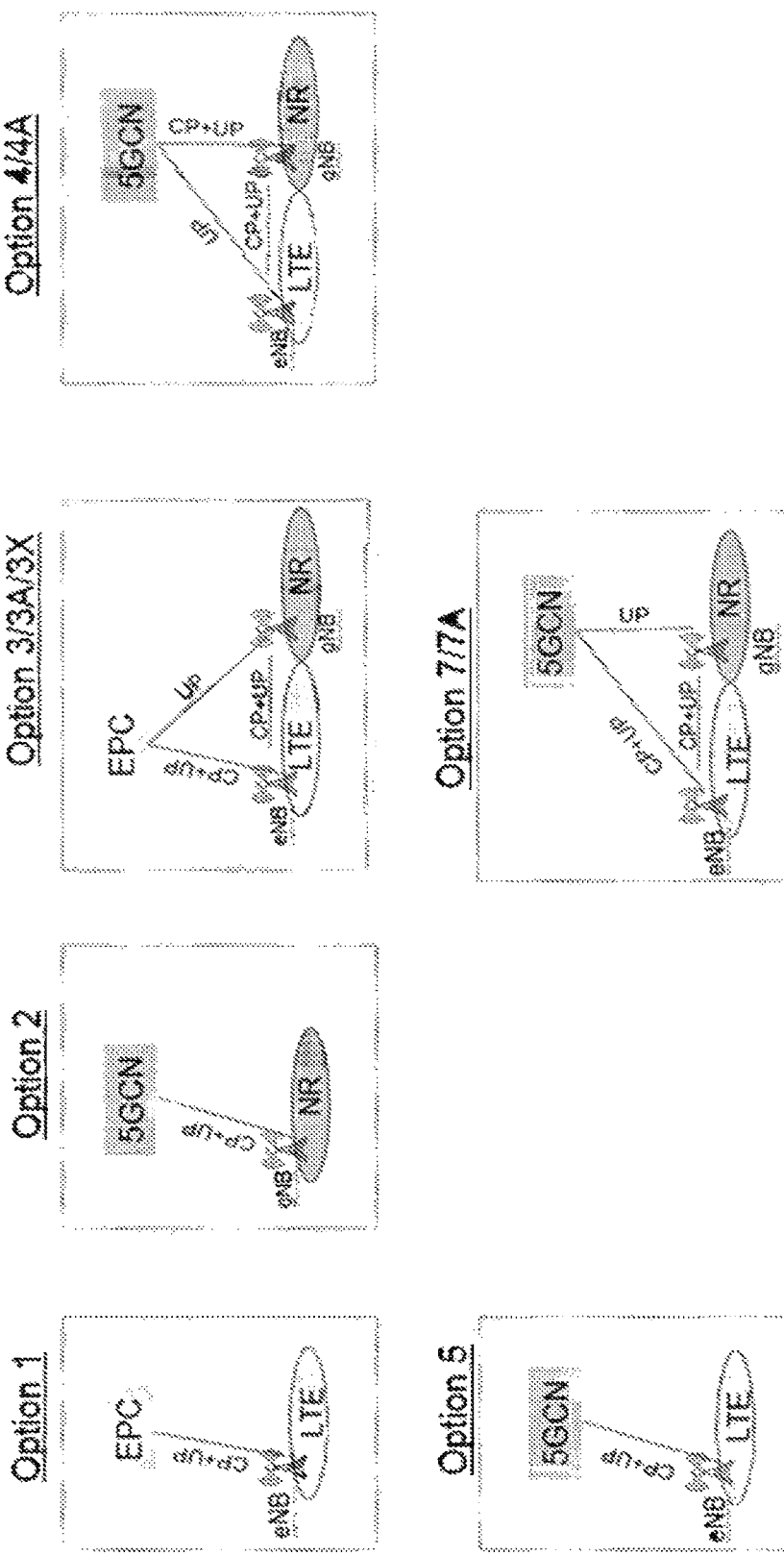
FIG. 5 is a network diagram illustrating LTE and NR interworking options.
Figure 6:
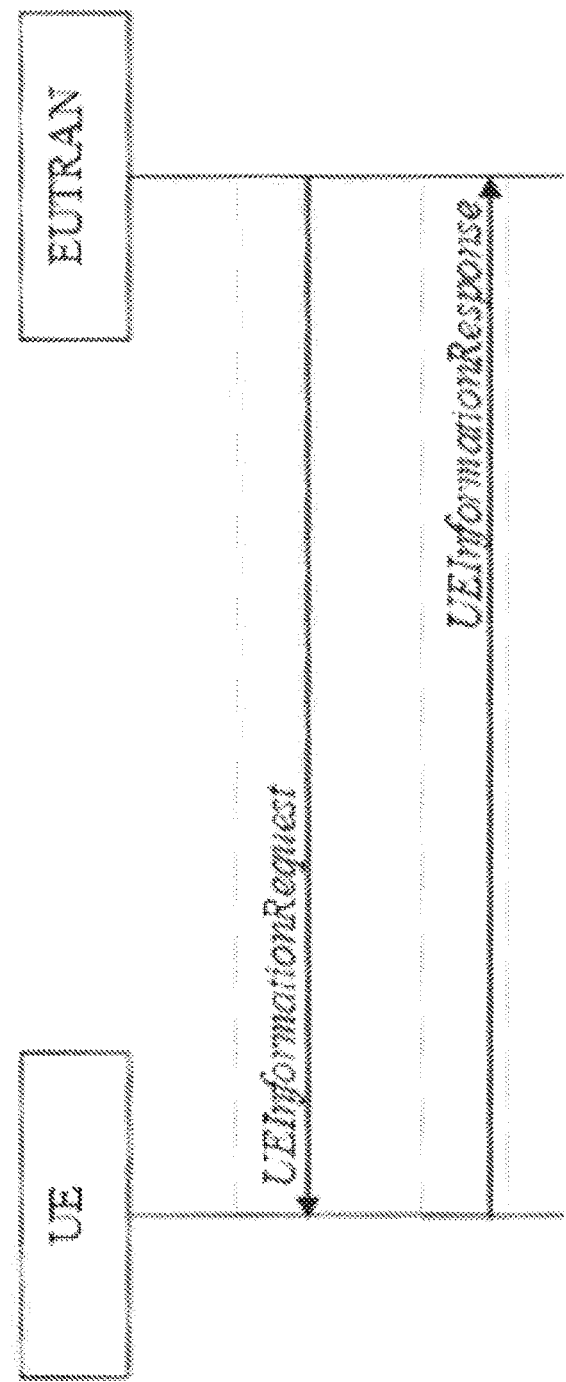
FIG. 6 is a sequence diagram illustrating a UE information request and response.

As described above, certain challenges currently exist with configuring carrier aggregation (CA) and/or dual connectivity (DC) when a user equipment (UE) resumes from a dormant state. Certain aspects of the present disclosure and their embodiments may provide solutions to these or other challenges.

Particular embodiments are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

A measurement configuration provided to a UE in RRC_IDLE may follow at least the existing solution in long term evolution (LTE) Rel-15 where the UE is provided with a list of carriers, either through broadcasted or dedicated signaling, for measurements. The type of measurements to be performed (e.g., reference signal received power (RSRP) and/or reference signal received quality (RSRQ)) may also be indicated. Other configuration information may also be present, such as validity area, timers, list of cells, etc. According to some embodiments, upon resume the UE has idle/inactive measurements available that may be provided to the network to speed up the setup of carrier aggregation and/or any form of dual/multi-radio connectivity.

Below are examples of a possible measurement configuration for these early measurements:

| MeasIdleConfig information element |
|---|
| ``` |
| -- ASN1START |
| MeasIdleConfigSIB-r15 ::= SEQUENCE { |
|     measIdleCarrierListEUTRA-r15         EUTRA-CarrierList-r15, |
|     ... |
| } |
| MeasIdleConfigDedicated-r15 ::= SEQUENCE { |
|     measIdleCarrierListEUTRA-r15         EUTRA-CarrierList-r15 |
|             OPTIONAL, -- Need OR |
|     measIdleDuration-r15                 ENUMERATED {sec10, sec30, sec60, sec120, |
|         sec180, sec240, sec300, spare}, |
|     ... |
| } |
| EUTRA-CarrierList-r15 ::= SEQUENCE (SIZE (1..maxFreqIdle-r15)) OF MeasIdleCarrierEUTRA-r15 |
| MeasIdleCarrierEUTRA-r15::=              SEQUENCE { |
|     carrierFreq-r15                          ARFCN-ValueEUTRA-r9, |
|     allowedMeasBandwidth-r15                 AllowedMeasBandwidth, |
|     validityArea-r15                         CellList-r15 |
|             OPTIONAL,    -- Need OR |
|     measCellList-r15                         CellList-r15 |
|             OPTIONAL,    -- Need OR |
|     reportQuantities                         ENUMERATED {rsrp, rsrq, both}, |
|     qualityThreshold-r15                     SEQUENCE { |
|         idleRSRP-Threshold-r15                   RSRP-Range |
|                 OPTIONAL, -- Need OR |
|         idleRSRQ-Threshold-r15                   RSRQ-Range-r13            OPTIONAL    -- Need OR |
| } |
| ``` |

| MeasIdleConfig information element |
|---|
| OPTIONAL,  -- Need OR<br>...<br>}<br>CellList-r15 ::=         SEQUENCE (SIZE (1.. maxCellMeasIdle-r15)) OF PhysCellIdRange<br>-- ASN1STOP |

The measurements to be reported by the UE during the transition to RRC_CONNETED may follow at least the existing solution in LTE Rel-15, as shown below:

```
UEInformationResponse-v1530-IEs ::= SEQUENCE {
    measResultListIdle-r15
    MeasResultListIdle-r15              OPTIONAL,
    flightPathInfoReport-r15            FlightPathInfoReport-
r15           OPTIONAL, nonCriticalExtension
    SEQUENCE { }                        OPTIONAL
}
MeasResultListIdle-r15 ::=          SEQUENCE          (SIZE
(1..maxIdleMeasCarriers-r15)) OF MeasResultIdle-r15
MeasResultIdle-r15 ::= SEQUENCE {
    measResultServingCell-r15
    SEQUENCE {
            rsrpResult-r15              RSRP-Range,
            rsrqResult-r15              RSRQ-Range-r13
    },
    measResultNeighCells-r15      CHOICE {
            measResultIdleListEUTRA-r15
    MeasResultIdleListEUTRA-r15,
            ...
    }
                      OPTIONAL,
    ...
}
MeasResultIdleListEUTRA-r15 ::=     SEQUENCE          (SIZE
(1..maxCellMeasIdle-r15)) OF MeasResultIdleEUTRA-r15
MeasResultIdleEUTRA-r15 ::=   SEQUENCE {
    carrierFreq-r15                     ARFCN-
ValueEUTRA-r9,
    physCellId-r15                      PhysCellId,
    measResult-r15                      SEQUENCE {
            rsrpResult-r15                  RSRP-Range,
            rsrqResult-r15                  RSRQ-Range-
r13
    },
    ...
}
```

Some embodiments include a method at a wireless terminal, such as a UE, for measurement reporting during a transition from a dormant state to connected state. Dormant state refers to a protocol state (like an radio resource control (RRC) state) where the UE performs actions optimized for power savings, such as: RRC_IDLE without stored AS context; RRC_IDLE with stored AS context; and RRC_INACTIVE.

Because the particular embodiments include measurement reporting performed in a dormant state when the UE is resuming, particular embodiments include the situation where the UE is suspended in one radio access technology (RAT) (e.g., RRC_CONNECTED to RRC_IDLE or RRC_INACTIVE) and resumes in another RAT (e.g., RRC_INACTIVE or RRC_IDLE to RRC_CONNECTED), such as in the following cases: UE is suspended in NR and resumes in LTE; UE is suspended in LTE and resumes in NR; UE is suspended in NR and resumes in NR; UE is suspended in LTE and resumes in LTE; or, in more general terms, the UE is suspended in RAT-1 and resumes in RAT-2, where RAT-1 and RAT-2 may be the same or different RATs.

Particular embodiments include additional information in the early measurement indication or in the early measurement report itself during a transition from an IDLE state or dormant state (e.g., RRC_IDLE or RRC_INACTIVE) to a connected state (e.g., during inactive to connected transition).

In a first group of embodiments for early measurements, the UE reads in system information that the network supports early measurements and, if the UE has stored early measurements performed in dormant state, it includes an indication in the RRC Resume Complete like message (or in an RRC Connection Resume Complete, or RRC Connection Setup Complete, etc.). The indication includes additional information such as the uplink buffer status, the type of data (e.g., QoS profile), expected downlink traffic size, etc.

In a variant of the first group of embodiments for early measurements, the network may request the UE to report early measurements (e.g., in an UEInformationRequest) (e.g., even without receiving from the UE an indication of the availability of early measurements) and the UE reports early measurements (e.g., in a UEInformationResponse) and includes in the message additional information such as the uplink buffer status, the type of data (e.g., QoS profile), expected downlink traffic size, etc.

In a second group of embodiments for early measurements, if the UE has stored early measurements performed in dormant state, the UE includes an indication in the RRC Resume Request like message (e.g., RRCResumeRequest, RRCConnectionResumeRequest, RRCSetupRequest, RRCConnectionSetupRequet, etc.). The indication includes additional information such as the uplink buffer status, the type of data (e.g., QoS profile), expected downlink traffic size, etc.

In a variant of the second group of embodiments for early measurements, the network may request (e.g., in an RRC Resume like message, like RRCResume, RRCConnectionResume, RRCSetup, RRCConnectionSetup) a report of early measurements (e.g., even without receiving from the UE an indication of the availability of early measurements). In particular embodiments, the early measurements are reported (e.g., in an RRC Resume Complete like message (e.g., like RRCResumeComplete, RRCSetupComplete, SecurityModeCommandComplete, etc.) or multiplexed with the RRC Resume Complete like message, and additional information is included in the message such as the uplink buffer status, the type of data (e.g., QoS profile), expected downlink traffic size, etc.

In a third group of embodiments for early measurements, if the UE has stored early measurements performed in dormant state, the UE indicates to the network during random-access, by selecting specific random-access parameter(s), such as a specific preamble from a pre-defined set. In particular embodiments, additional information is included in the random access, such as such as the uplink buffer status, the type of data (e.g., QoS profile), expected downlink traffic size, etc.

In a variant of the third group of embodiments for early measurements, the network may send a random-access response with an indication for early measurement reporting (e.g., even without receiving from the UE an indication of the availability of early measurements). In particular embodiments, the measurements are transmitted using the uplink grant (e.g., in an RRC Resume Request like message such as RRCResumeRequest, RRCConnectionResumeRequest or multiplexed with the Resume Request like message) and additional information is included in that message such as the uplink buffer status, the type of data (e.g., QoS profile), expected downlink traffic size, etc.

Although the examples described above are mainly focused on early measurements performed during RRC_IDLE or dormant state, the embodiments are equally applicable for connected mode measurements. In a fourth group of embodiments, the UE sends measurement reports that are triggered during RRC_CONNECTED mode (e.g., in a MeasurementReport like message) and additional information is included in that message such as the uplink buffer status, the type of data (e.g., QoS profile), expected downlink traffic size, etc.

Particular embodiments include a method in a wireless device to determine whether to report additional information (such as the uplink buffer status, the type of data (e.g., QoS profile), expected downlink traffic size, etc.) with early idle/inactive mode measurements when transitioning from an RRC_IDLE or dormant state (e.g., RRC_IDLE with UE AS context, or from RRC_INACTIVE).

In particular embodiments, the UE receives, from a network node, configuration of additional information to include when indicating the availability of early idle mode measurements, configuration of additional information to include when reporting early idle mode measurements, and configuration of additional information to include when reporting connected mode measurements. The UE performs and stores idle mode measurements according to the received idle mode measurement configurations. The UE performs connected mode measurements according to the received measurement configuration.

When transitioning to CONNECTED state from dormant or IDLE state, the UE may receive an indication from the network whether to include early measurements in, for example, configuration by network prior to entering dormant state, reception of indication from network in e.g. broadcasted system information, or reception of indication from network in e.g. a RRC Resume like message.

Upon the initiation of RRC Resume request like procedure, the UE includes additional information in the early measurement indication or the early measurement report (in the case of transition to CONNECTED state from dormant or IDLE state), or including additional information in the connected mode measurement report, where the additional information may comprise any one or more of the following. The additional information may comprise a buffer status report (BSR), which may include detailed information like a normal BSR sent at the medium access control (MAC) level, or quantized information (e.g., small, medium, large).

The additional information may comprise information regarding expected downlink traffic, if available. In some cases, the UE may estimate the expected data in the downlink depending on the type of service being carried by the bearer/service that is going to be setup.

The additional information may comprise information regarding the QoS profile(s) of the services/traffic being established. In one example, the application layer provides information to the access stratum about what type of data is expected. For example, if the application layer initiates an ftp download or video streaming and if the AS is informed of this, it could decide to include that information in the early measurement availability indications, early measurement report, or connected mode measurements.

Several example realizations on how the additional information can be provided by the network are shown below. Note that only BSR example is illustrated, but all the other additional information described above could be encoded in a similar manner (e.g., by using a field/IE for each information to be added).

Example 1. Quantized Buffer Status Report in Idle Mode Meas Results (LTE)

```
MeasResultListIdle-r15 ::=            SEQUENCE       (SIZE
  (1..maxIdleMeasCarriers-r15)) OF MeasResultIdle-r15
MeasResultIdle-r15 ::= SEQUENCE {
    measResultServingCell-r15
    SEQUENCE {
        rsrpResult-r15              RSRP-Range,
        rsrqResult-r15              RSRQ-Range-r13
    },
    measResultNeighCells-r15    CHOICE {
        measResultIdleListEUTRA-r15
    MeasResultIdleListEUTRA-r15,
        ...
    }
                                   OPTIONAL,
    ...,
    [[
        ulBSR    ENUMERATED {small, medium, big}
    OPTIONAL,
    ]]
}
```

-continued

```
MeasResultIdleListEUTRA-r15 ::=   SEQUENCE        (SIZE
(1..maxCellMeasIdle-r15)) OF MeasResultIdleEUTRA-r15
MeasResultIdleEUTRA-r15 ::=    SEQUENCE {
    carrierFreq-r15                    ARFCN-
ValueEUTRA-r9,
    physCellId-r15                     PhysCellId,
    measResult-r15                     SEQUENCE {
        rsrpResult-r15                 RSRP-Range,
        rsrqResult-r15                 RSRQ-Range-
r13
    },
    ...
}
```

Example 2. Quantized Buffer Status Report in Measurement Report (LTE)

```
MeasurementReport ::=              SEQUENCE {
    criticalExtensions             CHOICE {
        c1                         CHOICE{
            measurementReport-r8
MeasurementReport-r8-IEs,
            spare7 NULL,
            spare6 NULL, spare5 NULL, spare4 NULL,
            spare3 NULL, spare2 NULL, spare1 NULL
        },
        criticalExtensionsFuture   SEQUENCE { }
    }
}
MeasurementReport-r8-IEs ::=       SEQUENCE {
    measResults                    MeasResults,
    nonCriticalExtension
    MeasurementReport-v8a0-IEs     OPTIONAL
}
MeasurementReport-v8a0-IEs ::= SEQUENCE {
    lateNonCriticalExtension       OCTET STRING
        OPTIONAL,
    nonCriticalExtension
    MeasurementReport-v16xy-IEs { }
        OPTIONAL
}
MeasurementReport-v16xy-IEs ::= SEQUENCE {
    ulBSR  ENUMERATED {small, medium, big}
        OPTIONAL,
    nonCriticalExtension           SEQUENCE { }
                                   OPTIONAL
}
```

Example 3. Quantized Buffer Status Report in Measurement Report (NR)

```
MeasurementReport ::=      SEQUENCE {
    criticalExtensions     CHOICE {
        measurementReport             MeasurementReport-
IEs,
        criticalExtensionsFuture      SEQUENCE { }
    }
}
MeasurementReport-IEs ::=  SEQUENCE {
    measResults                MeasResults,
    lateNonCriticalExtension       OCTET STRING
OPTIONAL,
    nonCriticalExtension           MeasurementReport-
v16xy-IEs OPTIONAL
}
```

```
MeasurementReport-v16xy-IEs ::= SEQUENCE {
    ulBSR              ENUMERATED {small, medium, big}
        OPTIONAL,
    nonCriticalExtension           SEQUENCE{ }
        OPTIONAL
}
```

Note that instead of including the BSR indication in the MeasurementReport, it is also possible to include it directly in the measResults.

Example 4. Quantized Buffer Status in UE Information Response (LTE)

```
UEInformationResponse-v1530-IEs ::= SEQUENCE {
    measResultListIdle-r15
    MeasResultListIdle-r15         OPTIONAL,
    flightPathInfoReport-r15       FlightPathInfoReport-
r15  OPTIONAL,
    nonCriticalExtension
    UEInformationResponse-v16xy-IEs
        OPTIONAL
}
UEInformationResponse-v1530-IEs ::= SEQUENCE {
    ulBSR              ENUMERATED {small, medium,
big}   OPTIONAL,
    nonCriticalExtension   SEQUENCE { }
        OPTIONAL
}
```

Example 5. Quantized Buffer Status in RRCConnectionResumeComplete (LTE)

```
RRCConnectionResumeComplete-v1530-IEs ::= SEQUENCE {
    logMeasAvailableBT-r15         ENUMERATED
{true}            OPTIONAL,
    logMeasAvailableWLAN-r15       ENUMERATED {true}
                        OPTIONAL,
    idleMeasAvailable-r15          ENUMERATED
{true}            OPTIONAL,
    flightPathInfoAvailable-r15    ENUMERATED
{true}            OPTIONAL,
    nonCriticalExtension
    RRCConnectionResumeComplete-v16xy
        OPTIONAL
}
RRCConnectionResumeComplete-v16xy-IEs ::= SEQUENCE {
    ulBSR              ENUMERATED {small,
medium, big}   OPTIONAL,
    nonCriticalExtension           SEQUENCE { }
                         OPTIONAL
}
```

Example 6. Quantized Buffer Status in RRCResumeComplete (NR)

```
RRCResumeComplete ::=          SEQUENCE {
    rrc-TransactionIdentifier              RRC-
TransactionIdentifier,
    criticalExtensions             CHOICE {
        rrcResumeComplete              RRCResumeComplete-
IEs,
        criticalExtensionsFuture           SEQUENCE { }
    }
```

```
}
RRCResumeComplete-IEs ::=        SEQUENCE {
    dedicatedNAS-Message             DedicatedNAS-Message
OPTIONAL,
    selectedPLMN-Identity            INTEGER (1..maxPLMN)
OPTIONAL,
    uplinkTxDirectCurrentList
UplinkTxDirectCurrentList
OPTIONAL,
    lateNonCriticalExtension         OCTET STRING
OPTIONAL,
    nonCriticalExtension             RRCResumeComplete-
v16xy-IEs OPTIONAL
}
RRCResumeComplete-v16xy-IEs ::= SEQUENCE {
    ulBSR                            ENUMERATED {small,
medium, big}      OPTIONAL,
    nonCriticalExtension                              SEQUENCE { }
                                     OPTIONAL
}
```

Example 7. Quantized Buffer Status in RRCConnectionSetupComplete (LTE)

```
RRCConnectionSetupComplete-v1530-IEs ::= SEQUENCE {
    logMeasAvailableBT-r15              ENUMERATED {true}
                                        OPTIONAL,
    logMeasAvailableWLAN-r15            ENUMERATED {true}
                                        OPTIONAL,
    idleMeasAvailable-r15               ENUMERATED {true}
                                        OPTIONAL,
    flightPathInfoAvailable-r15         ENUMERATED {true}
                                        OPTIONAL,
    connectTo5GC-r15                    ENUMERATED {true}
                                        OPTIONAL,
    registeredAMF-r15                   RegisteredAMF-r15
                                        OPTIONAL,
    s-NSSAI-list-r15                    SEQUENCE(SIZE
(1..maxNrofS-NSSAI-r15)) OF S-NSSAI-r15 OPTIONAL,
    ng-5G-S-TMSI-Bits-r15               CHOICE {
        ng-5G-S-TMSI-r15                    NG-5G-S-
TMSI-r15,
        ng-5G-S-TMSI-Part2-r15              BIT STRING
(SIZE (8))
    }
                                        OPTIONAL,
    nonCriticalExtension
    RRCConnectionSetupComplete-v1540-IEs    OPTIONAL
}
RRCConnectionSetupComplete-v1540-IEs ::= SEQUENCE {
    gummei-Type-v1540                       ENUMERATED
{mappedFrom5G}              OPTIONAL,
    guami-Type-r15                          ENUMERATED
{native, mapped}             OPTIONAL,
    nonCriticalExtension
    RRCConnectionSetupComplete-v16xy-IEs
    OPTIONAL
}
RRCConnectionSetupComplete-v16xy-IEs ::= SEQUENCE {
    ulBSR                                   ENUMERATED {small,
medium, big}              OPTIONAL, nonCriticalExtension
        SEQUENCE { }                                OPTIONAL
}
```

Example 8. Quantized Buffer Status in RRCSetupComplete (NR)

```
RRCSetupComplete ::=                    SEQUENCE {
    rrc-TransactionIdentifier                       RRC-TransactionIdentifier,
    criticalExtensions                  CHOICE {
        rrcSetupComplete                    RRCSetupComplete-IEs,
        criticalExtensionsFuture            SEQUENCE { }
    }
}
RRCSetupComplete-IEs ::=                SEQUENCE {
    selectedPLMN-Identity                   INTEGER (1..maxPLMN),
    registeredAMF                           RegisteredAMF OPTIONAL,
    guami-Type                              ENUMERATED {native, mapped} OPTIONAL,
    s-nssai-List                            SEQUENCE (SIZE (1..maxNrofS-NSSAI)) OF S-NSSAI OPTIONAL,
    dedicatedNAS-Message                    DedicatedNAS-Message,
    ng-5G-S-TMSI-Value                      CHOICE {
        ng-5G-S-TMSI                            NG-5G-S-TMSI,
        ng-5G-S-TMSI-Part2                      BIT STRING (SIZE (9))
    } OPTIONAL,
    lateNonCriticalExtension                OCTET STRING OPTIONAL,
    nonCriticalExtension                    RRCCSetupComplete-v16xy-IEs OPTIONAL
}
RegisteredAMF ::=                       SEQUENCE {
    plmn-Identity                           PLMN-Identity OPTIONAL,
    amf-Identifier                          AMF-Identifier
}
}
RRCCSetupComplete-v16xy-IEs ::= SEQUENCE {
    ulBSR                                   ENUMERATED {small, medium, big} OPTIONAL, nonCriticalExtension
            SEQUENCE { }                        OPTIONAL
}
```

Example 9. Quantized Buffer Status in RRCConnectionRequest (LTE)

```
RRCConnectionRequest ::=    SEQUENCE {
    criticalExtensions              CHOICE {
        rrcConnectionRequest-r8         RRCConnectionRequest-r8-IEs,
        rrcConnectionRequest-r15        RRCConnectionRequest-5GC-r15-IEs
    }
}
RRCConnectionRequest-r8-IEs ::=     SEQUENCE {
    ue-Identity                             InitialUE-Identity,
    establishmentCause                      EstablishmentCause,
    spare                                   BIT STRING (SIZE (1))
}
RRCConnectionRequest-5GC-r15-IEs ::=    SEQUENCE {
    ue-Identity                             InitialUE-Identity-5GC,
    establishmentCause                      EstablishmentCause-5GC,
    spare                                   BIT STRING (SIZE (1))
}
InitialUE-Identity ::=                  CHOICE {
    s-TMSI                                  S-TMSI,
    randomValue                             BIT STRING (SIZE (40))
}
InitialUE-Identity-5GC ::=              CHOICE {
    ng-5G-S-TMSI-Part1                      BIT STRING (SIZE (40)),
    randomValue                             BIT STRING (SIZE (40))
}
EstablishmentCause ::=                  ENUMERATED {
    emergency, highPriorityAccess, mt-Access, mo-Signalling,
    mo-Data, delayTolerantAccess-v1020, mo-VoiceCall-v1280, spare1}
EstablishmentCause-5GC ::=              ENUMERATED {
    emergency, highPriorityAccess, mt-Access, mo-Signalling,
    mo-Data, mo-VoiceCall, spare2, spare1}
```

Although the examples for the quantized buffer status report uses three distinct values (small, medium, large), some embodiments may use a more fine-grained quantization with more bits.

Because the LTE RRCConnectionRequest message is not extendable, some embodiments encode the uplink BSR using the spare bit (in the RRCConnectionRequest-r8-IEs or RRCConnectionRequest-5GC-r15-IEs), where a 0 can be considered as low data volume and a value of 1 meaning high data volume.

Some embodiments may modify the establishment cause value. An example is provided below:

```
Establishmentcause ::=              ENUMERATED {
                                       emergency,
highPriorityAccess, mt-Access, mo-Signalling,
                                       mo-Data,
delayTolerantAccess-v1020, mo-VoiceCall-v1280, mo-Data-high}
EstablishmentCause-5GC ::=          ENUMERATED {
                                       emergency,
highPriorityAccess, mt-Access, mo-Signalling,
                                       mo-Data, mo-
VoiceCall, mo-Data-medium, mo-Data-high}
```

Some embodiments define another message e.g. RRCConnectionRequest1 that has a larger size and use it for that purpose.

Example 10. Quantized Buffer Status in RRCSetup (NR)

```
RRCSetup ::=                SEQUENCE {
    rrc-TransactionIdentifier                   RRC-TransactionIdentifier,
    criticalExtensions      CHOICE {
        rrcSetup                RRCSetup-IEs,
        criticalExtensionsFuture    SEQUENCE { }
    }
}
RRCSetup-IEs ::=            SEQUENCE {
    radioBearerConfig           RadioBearerConfig,
    masterCellGroup             OCTET STRING (CONTAINING CellGroupConfig),
    lateNonCriticalExtension            OCTET STRING OPTIONAL,
    nonCriticalExtension        RRCSetup-IEs-v16xy-IEs OPTIONAL
}
RRCSetup-IEs-v16xy-IEs ::=          SEQUENCE {
    ulBSR               ENUMERATED   {small, medium, big}  OPTIONAL,
    nonCriticalExtension                SEQUENCE{ } OPTIONAL
}
```

Figure 7:
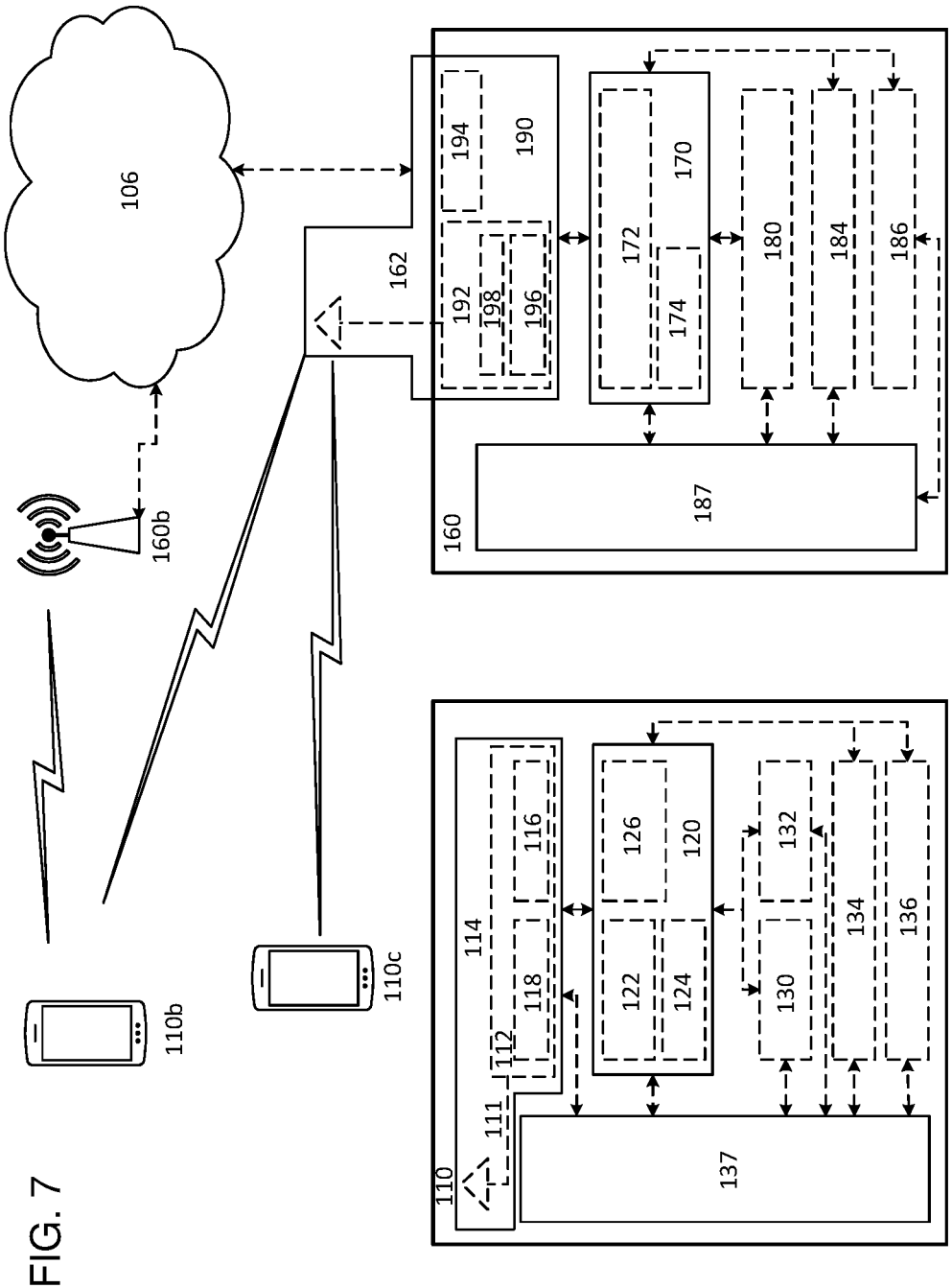
FIG. 7 is a block diagram illustrating an example wireless network.

FIG. 7 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), New Radio (NR), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations.

A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs.

As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 7, network node 160 includes processing circuitry 170, device readable medium 180, interface 190, auxiliary equipment 184, power source 186, power circuitry 187, and antenna 162. Although network node 160 illustrated in the example wireless network of FIG. 7 may represent a device that includes the illustrated combination of hardware components, other embodiments may comprise network nodes with different combinations of components.

It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node.

In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality.

For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB, gNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162.

Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160.

For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 7 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114.

Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips.

In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected).

User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry.

Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 7. For simplicity, the wireless network of FIG. 7 only depicts network 106, network nodes 160 and 160*b*, and WDs 110, 110*b*, and 110*c*. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

Figure 8:
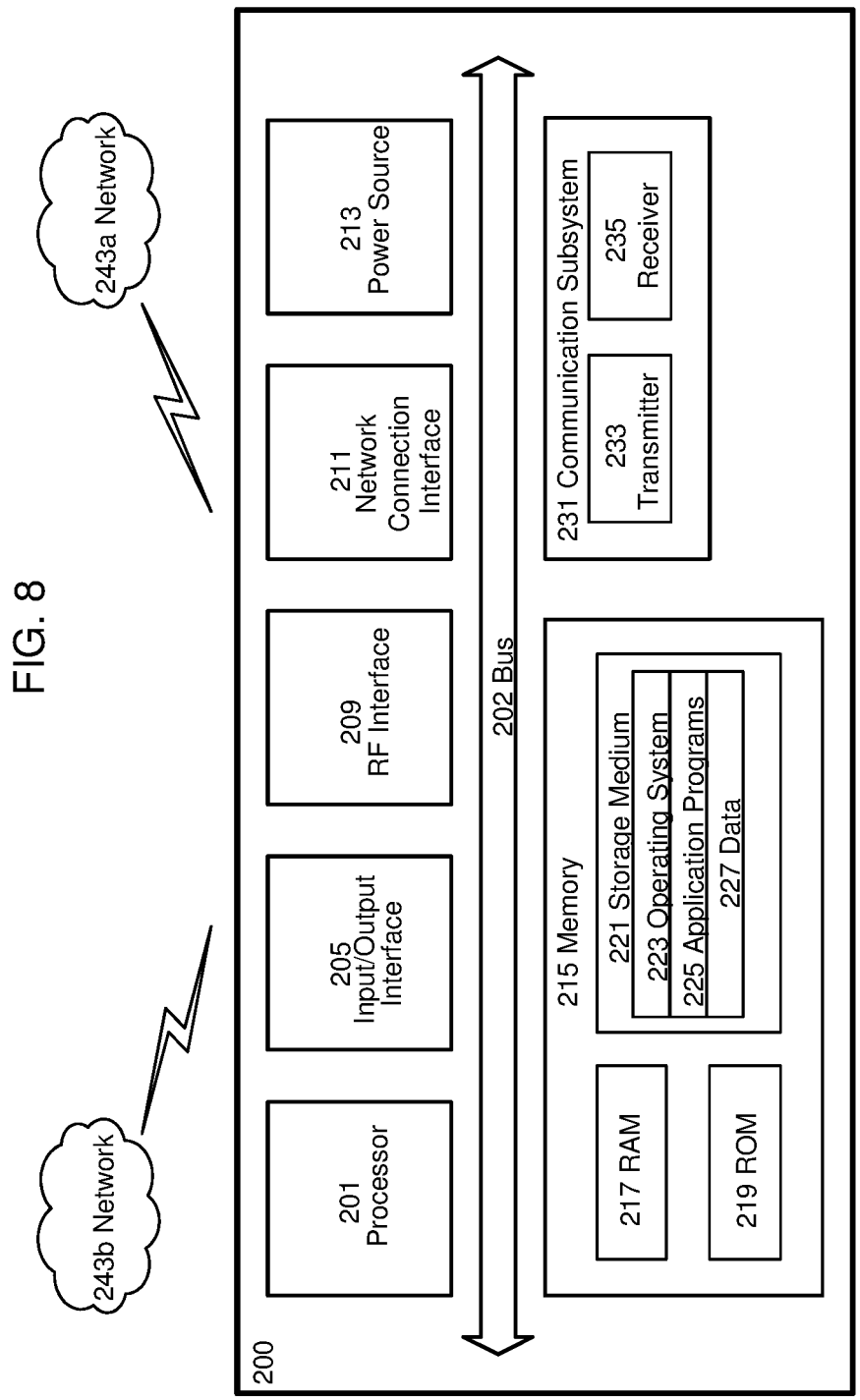
FIG. 8 illustrates an example user equipment, according to certain embodiments.

FIG. 8 illustrates an example user equipment, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 8, is one example of a WD configured for communication in accordance with one or more communication standards promulgated by the $3^{rd}$ Generation Partnership Project (3GPP), such as 3GPP's GSM, UMTS, LTE, and/or NR standards. As mentioned previously, the term WD and UE may be used interchangeable. Accordingly, although FIG. 8 is a UE, the components discussed herein are equally applicable to a WD, and vice-versa.

In FIG. 8, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 213, and/or any other component, or any combination thereof. Storage medium 221 includes operating system 223, application program 225, and data 227. In other embodiments, storage medium 221 may include other similar types of information. Certain UEs may use all the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205.

An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof.

UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory.

Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 8, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243*b* may encompass wired and/or wireless networks such as a local-area network (LAN), a wide-area network (WAN), a computer network, a wireless network, a telecommunications network, another like network or any combination thereof. For example, network 243*b* may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 9:
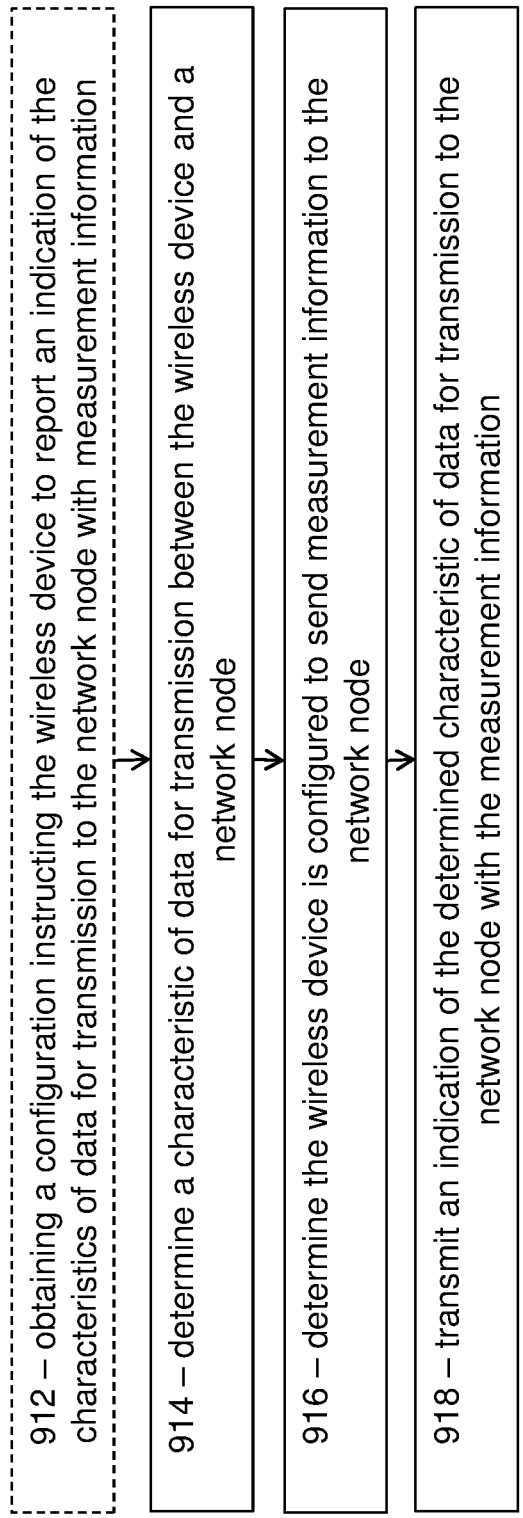
FIG. 9 is flowchart illustrating an example method in a wireless device, according to certain embodiments.

FIG. 9 is a flowchart illustrating an example method in a wireless device, according to certain embodiments. In particular embodiments, one or more steps of FIG. 9 may be performed by wireless device 110 described with respect to FIG. 7.

The method may begin at step 912, where the wireless device (e.g., wireless device 110) obtains a configuration instructing the wireless device to report the indication of the characteristics of data for transmission to the network node (e.g., network node 160) with the measurement information. Obtaining the configuration may comprise receiving any one of the following from the network node: a message received prior to entering a dormant state (e.g., an RRC configuration); a message received during a transition from a dormant state to a connected state (e.g., a random access message); and a message received via broadcast information (e.g., a system information block). The wireless device may obtain the configuration according to any of the examples or embodiments described above.

At step 914, the wireless device determining a characteristic of data for transmission between the wireless device and a network node. In particular embodiments, the determined characteristic of data for transmission comprises at least one of a buffer status, a type of data, a quality of service profile, expected downlink traffic size, a type of service, or any other characteristics described above.

At step 916, the wireless device determines that it is configured to send measurement information to the network node. In particular embodiments, the measurement information comprises an indication that measurements are available or a measurement report.

At step 918, the wireless device transmits an indication of the determined characteristic of data for transmission to the network node with the measurement information. In particular embodiments, the measurement information comprises early measurement information for early measurements performed during a dormant state, and transmitting the measurement information to the network node comprises transmitting the measurement information during a transition to a connected state. The dormant state may comprise one of RRC_IDLE and RRC_INACTIVE, and the connected state may comprise RRC_CONNECTED.

The measurement information may comprise measurement information for measurements performed during a connected state and transmitting the measurement information to the network node may comprise transmitting the measurement information during the connected state.

In particular embodiments, transmitting the indication of the characteristic of data for transmission and the measurement information to the network node comprises including the indication of the characteristic of data and the measurement information in one of a RRC resume complete, RRC connection resume complete, RRC setup complete, RRC connection setup complete, RRC setup request, RRC connection request, user equipment information response, measurement report, random access request, and security mode command complete message.

The wireless device may transmit the indication of the determined characteristic of data for transmission to the network node according to any of the embodiments and examples described above.

Modifications, additions, or omissions may be made to method 900 of FIG. 9. Additionally, one or more steps in the method of FIG. 9 may be performed in parallel or in any suitable order.

Figure 10:
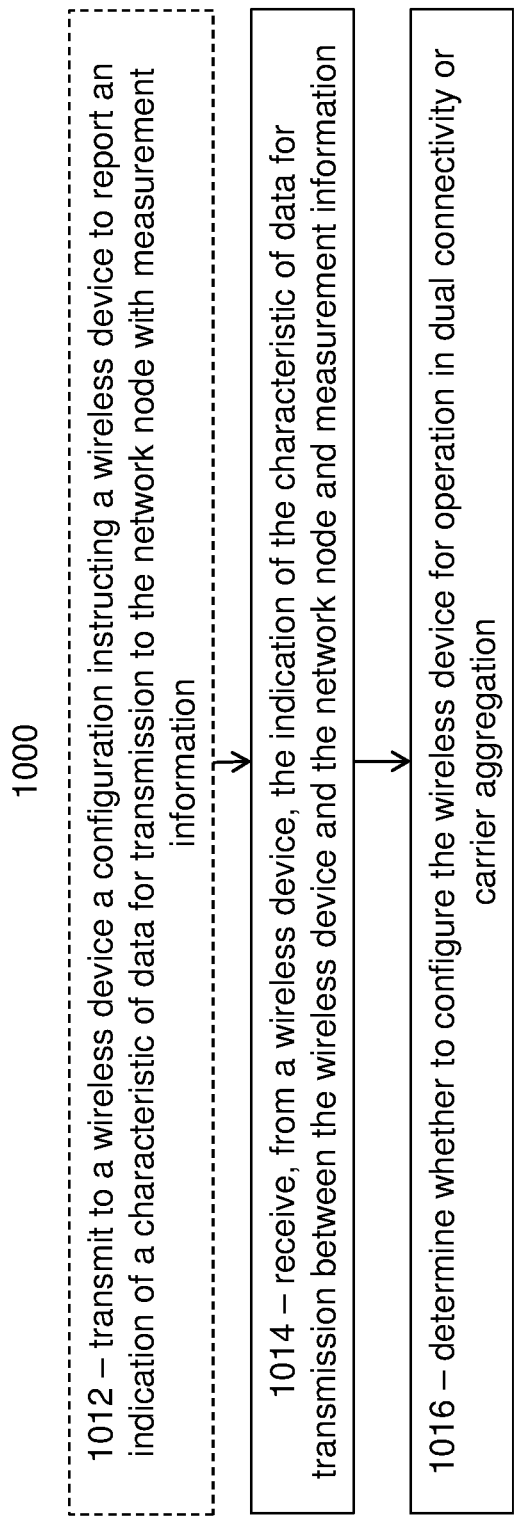
FIG. 10 is a flowchart illustrating an example method in a network node, according to certain embodiments.

FIG. 10 is a flowchart illustrating an example method in a network node, according to certain embodiments. In particular embodiments, one or more steps of FIG. 10 may be performed by network node 160 described with respect to FIG. 7.

The method begins at step 1012, where the network node (e.g., network node 160) transmits, to a wireless device (e.g., wireless device 110), a configuration instructing the wireless device to report an indication of a characteristic of data for transmission to the network node with measurement information. Transmitting the configuration may comprise transmitting any one of the following: a message transmitted prior to the wireless device entering a dormant state; a message transmitted during a transition of the wireless device from a dormant state to a connected state; and a message transmitted via broadcast information. The message may be similar to the messages described with respect to step 912 of FIG. 9.

At step 1014, the network node receives, from the wireless device, an indication of a characteristic of data for transmission between the wireless device and the network node and measurement information.

In particular embodiments, the determined characteristic of data for transmission comprises at least one of a buffer status, a type of data, a quality of service profile, expected downlink traffic size, and a type of service.

In particular embodiments, the measurement information comprises an indication that measurements are available or a measurement report.

In particular embodiments, the measurement information comprises early measurement information for early measurements performed during a dormant state of the wireless device, and receiving the measurement information comprises receiving the measurement information during a transition of the wireless device to a connected state. The dormant state may comprise one of RRC_IDLE and RRC_INACTIVE, and the connected state may comprise RRC_CONNECTED. The measurement information may comprise measurement information for measurements performed during a connected state of the wireless device and receiving the measurement information may comprise receiving the measurement information during the connected state of the wireless device.

In particular embodiments, receiving the indication of the characteristic of data for transmission and the measurement information comprises receiving the indication of the characteristic of data and the measurement information in one of a RRC resume complete, RRC connection resume complete, RRC setup complete, RRC connection setup complete, RRC setup request, RRC connection request, user equipment information response, measurement report, random access request, and security mode command complete message.

At step 1016, the network node, based on the characteristic of data for transmission between the wireless device and the network node, determines whether to configure the wireless device for operation in dual connectivity or carrier aggregation. For example, if the wireless device has a large amount of data to transmit, the network node may configure the wireless device for CA and/or DC.

Modifications, additions, or omissions may be made to method 1000 of FIG. 10. Additionally, one or more steps in the method of FIG. 10 may be performed in parallel or in any suitable order.

FIG. 11 illustrates a schematic block diagram of two apparatuses in a wireless network (for example, the wireless network illustrated in FIG. 7). The apparatuses include a wireless device and a network node (e.g., wireless device 110 and network node 160 illustrated in FIG. 7). Apparatuses 1600 and 1700 are operable to carry out the example methods described with reference to FIGS. 9 and 10, respectively, and possibly any other processes or methods disclosed herein. It is also to be understood that the methods of FIGS. 9 and 10 are not necessarily carried out solely by apparatus 1600 and/or apparatus 1700. At least some operations of the method can be performed by one or more other entities.

Virtual apparatuses 1600 and 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

In some implementations, the processing circuitry may be used to cause obtaining module 1602, determining module 1604, transmitting module 1606, and any other suitable units of apparatus 1600 to perform corresponding functions according one or more embodiments of the present disclosure. Similarly, the processing circuitry described above may be used to cause receiving module 1702, determining module 1704, transmitting module 1706, and any other suitable units of apparatus 1700 to perform corresponding functions according one or more embodiments of the present disclosure.

As illustrated in FIG. 11, apparatus 1600 includes obtaining module 1602 configured to obtain a configuration instructing the wireless device to report an indication of the characteristics of data for transmission to the network node with measurement information, according to any of the embodiments and examples described herein. Apparatus 1600 also includes determining module 1604 configured to determine a characteristic of data for transmission between the wireless device and a network node, according to any of the embodiments and examples described herein. Transmitting module 1606 is configured to transmit an indication of the determined characteristic of data for transmission to the network node with the measurement information, according to any of the embodiments and examples described herein.

As illustrated in FIG. 11, apparatus 1700 includes receiving module 1702 configured to receive, from a wireless device, an indication of a characteristic of data for transmission between the wireless device and the network node and measurement information. Determining module 1704 is configured to determine whether to configure carrier aggregation and/or dual connectivity, according to any of the embodiments and examples described herein. Transmitting module 1706 is configured to transmit to a wireless device a configuration instructing a wireless device to report an indication of a characteristic of data for transmission to the network node with measurement information, according to any of the embodiments and examples described herein.

Figure 12:
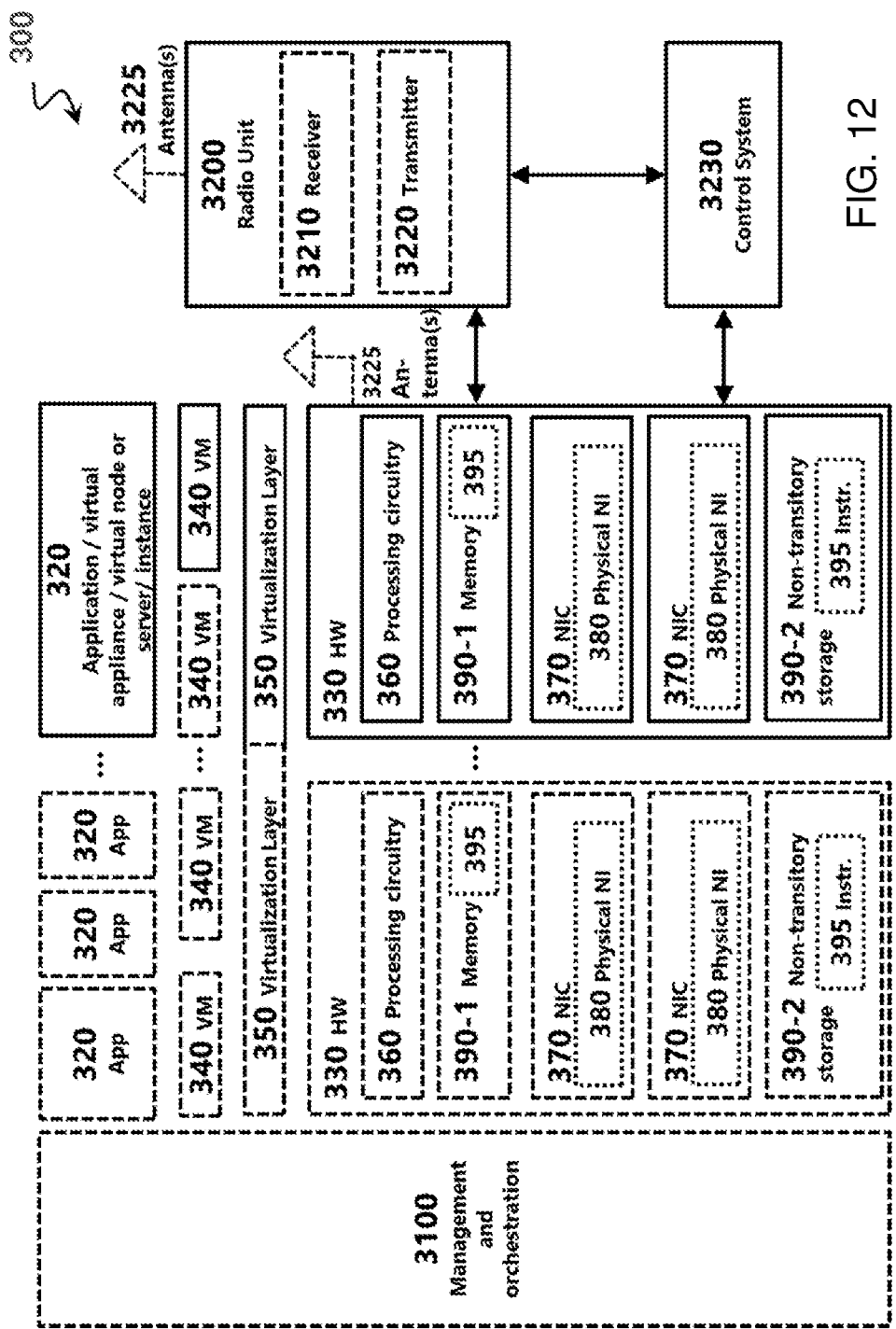
FIG. 12 illustrates an example virtualization environment, according to certain embodiments.

FIG. 12 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 12, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Figure 13:
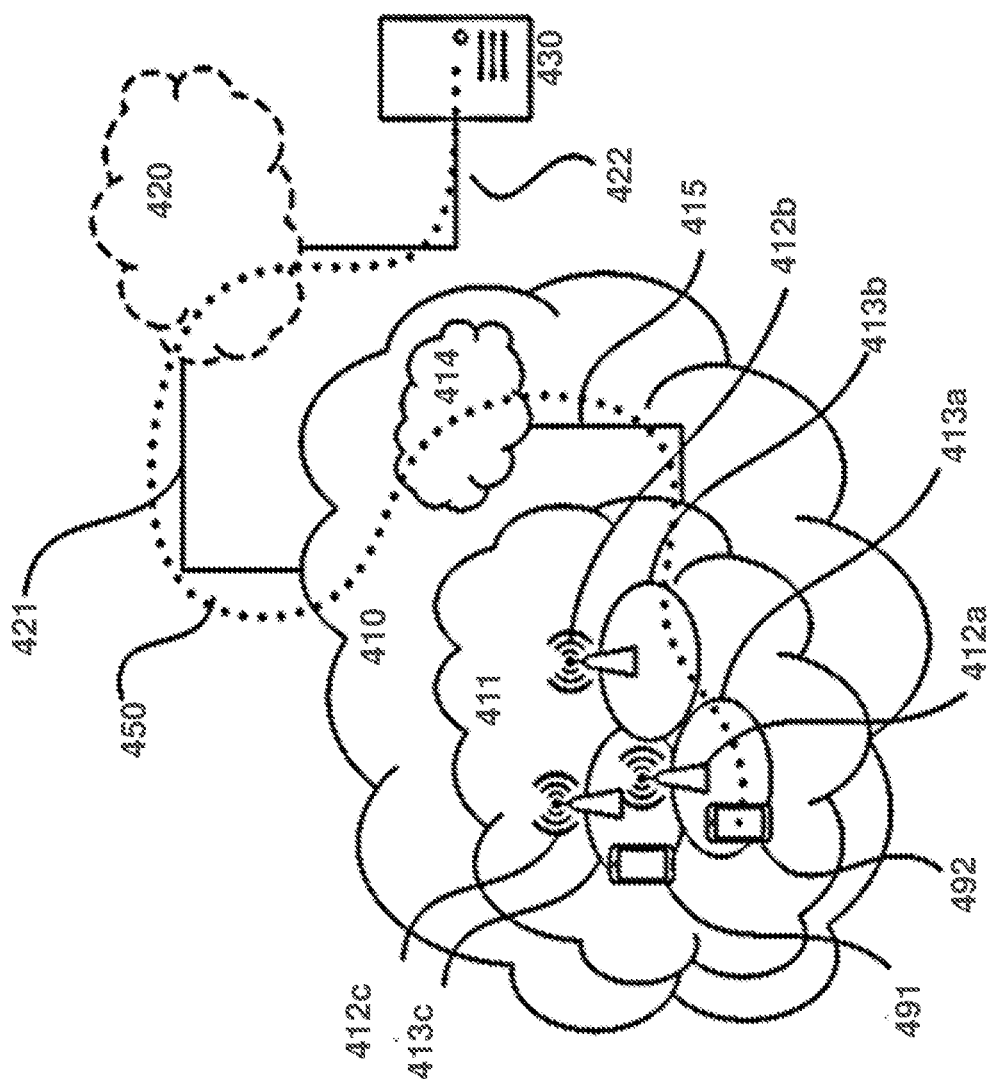
FIG. 13 illustrates an example telecommunication network connected via an intermediate network to a host computer, according to certain embodiments.

Still in the context of NFV, Virtual Network Function (VNF) is responsible for handling specific network functions that run in one or more virtual machines 340 on top of hardware networking infrastructure 330 and corresponds to application 320 in FIG. 13.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

With reference to FIG. 13, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 13 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 14:
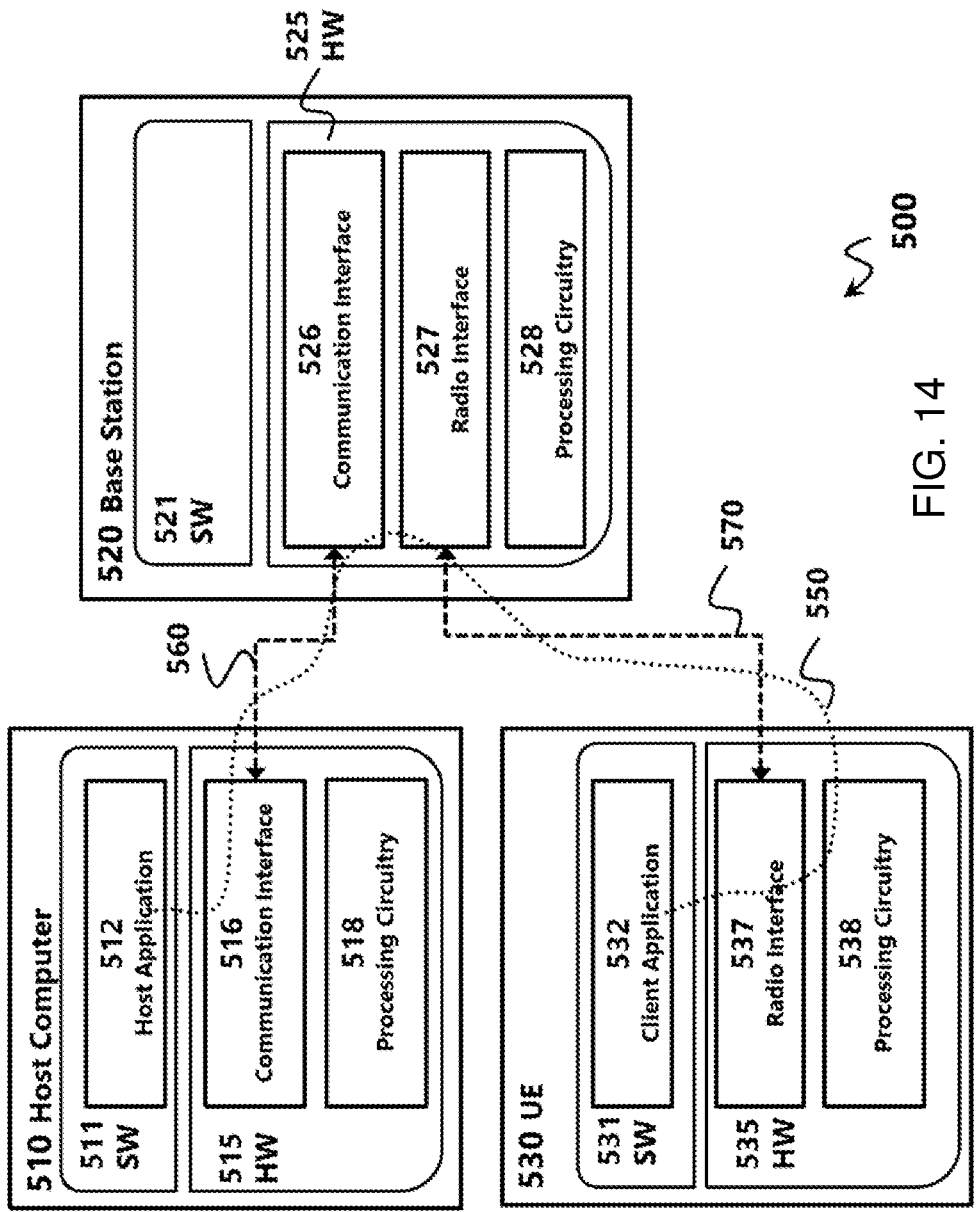
FIG. 14 illustrates an example host computer communicating via a base station with a user equipment over a partially wireless connection, according to certain embodiments.

FIG. 14 illustrates an example host computer communicating via a base station with a user equipment over a partially wireless connection, according to certain embodiments. Example implementations, in accordance with an embodiment of the UE, base station and host computer discussed in the preceding paragraphs will now be described with reference to FIG. 14. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 14) served by base station 520. Communication interface 526 may be configured to facilitate connection 560 to host computer 510. Connection 560 may be direct, or it may pass through a core network (not shown in FIG. 14) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 14 may be similar or identical to host computer 430, one of base stations 412a, 412b, 412c and one of UEs 491, 492 of FIG. 13, respectively. This is to say, the inner workings of these entities may be as shown in FIG. 14 and independently, the surrounding network topology may be that of FIG. 13.

In FIG. 14, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., based on load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the signaling overhead and reduce latency, and thereby provide benefits such as reduced user waiting time, better responsiveness and extended battery life.

A measurement procedure may be provided for monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 15:
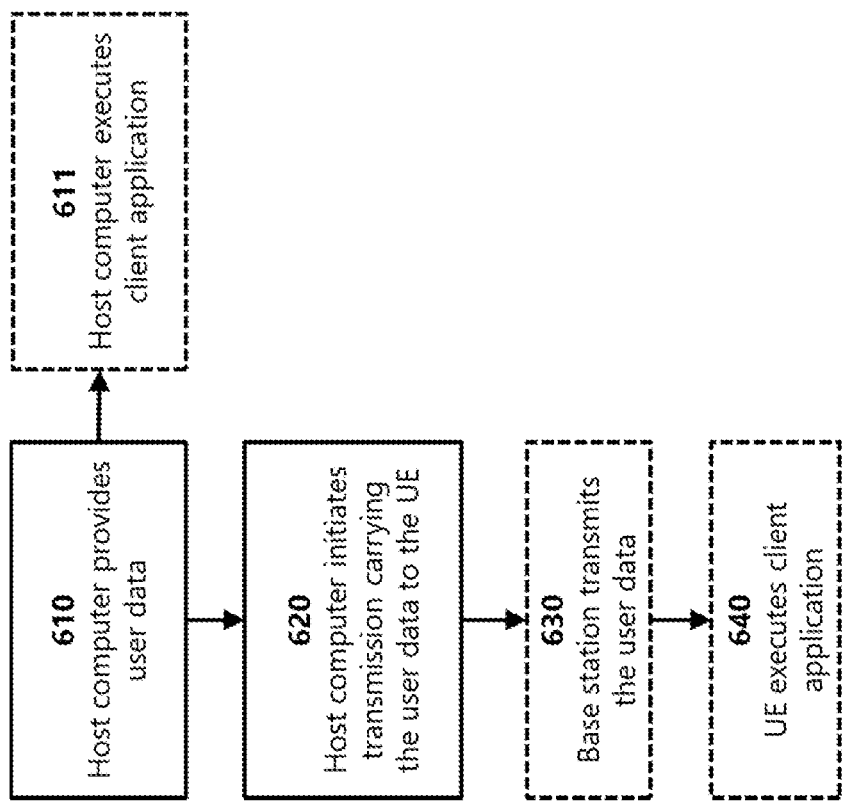
FIG. 15 is a flowchart illustrating a method implemented, according to certain embodiments.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section.

In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 16:
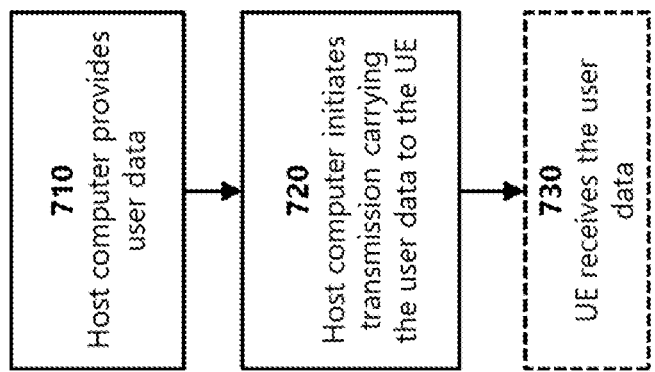
FIG. 16 is a flowchart illustrating a method implemented in a communication system, according to certain embodiments.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section.

In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 17:
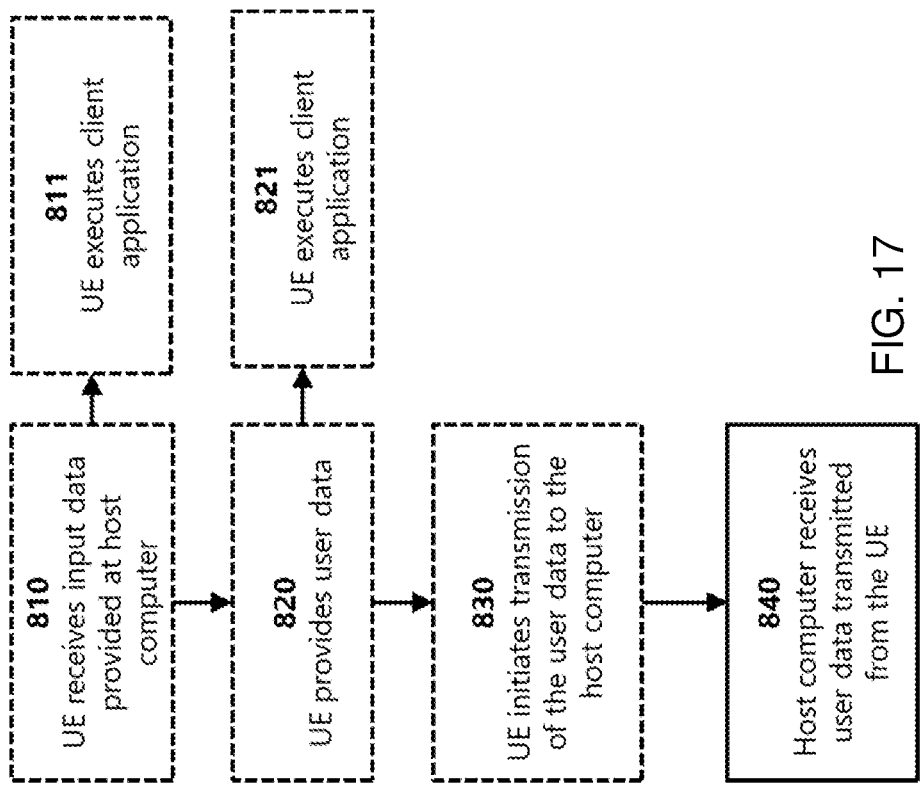
FIG. 17 is a flowchart illustrating a method implemented in a communication system, according to certain embodiments.

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section.

In step 810 (which may be optional), the UE receives input data provided by the host computer. Additionally, or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 18:
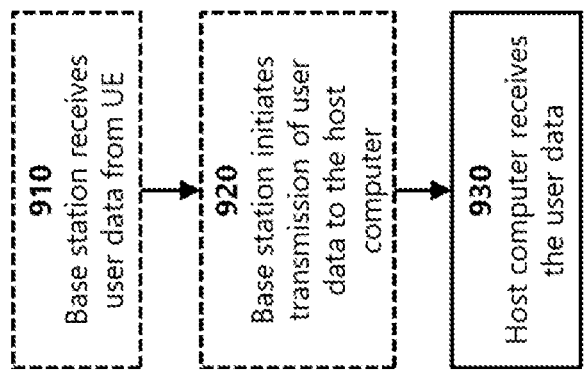
FIG. 18 is a flowchart illustrating a method implemented in a communication system, according to certain embodiments.

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section.

In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICHCommon Pilot Channel CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

What is claimed is:

1. A method performed by a wireless device, the method comprising:
   determining, by the wireless device, a characteristic of data for transmission between the wireless device and a network node;
   determining, by the wireless device, the wireless device is configured to send measurement information to the network node; and
   transmitting, by the wireless device, an indication of the determined characteristic of data for transmission to the network node with the measurement information, wherein transmitting the indication of the characteristic of data for transmission and the measurement information to the network node comprises including the indication of the characteristic of data and the measurement information in one of a radio resource control (RRC) resume complete, RRC connection resume complete, RRC setup complete, RRC connection setup complete, RRC setup request, RRC connection request, user equipment information response, measurement report, random access request, and security mode command complete message.

2. The method of claim 1, wherein the measurement information comprises an indication that measurements are available.

3. The method of claim 1, wherein the measurement information comprises a measurement report.

4. The method of claim 1, wherein the measurement information comprises early measurement information for early measurements performed during a dormant state, and transmitting the measurement information to the network node comprises transmitting the measurement information during a transition to a connected state.

5. The method of claim 4, wherein the dormant state comprises one of RRC IDLE and RRC INACTIVE, and the connected state comprises RRC CONNECTED.

6. The method of claim 1, wherein the measurement information comprises measurement information for measurements performed during a connected state and transmitting the measurement information to the network node comprises transmitting the measurement information during the connected state.

7. The method of claim 1, further comprising obtaining a configuration instructing the wireless device to report the indication of the characteristics of data for transmission to the network node with the measurement information.

8. The method of claim 7, wherein obtaining the configuration comprises receiving any one of the following from the network node:
- a message received prior to entering a dormant state;
- a message received during a transition from a dormant state to a connected state; and
- a message received via broadcast information.

9. The method of claim 1, wherein the determined characteristic of data for transmission comprises at least one of a buffer status, a type of data, a quality of service profile, expected downlink traffic size, and a type of service.

10. A wireless device comprising:
- transceiver circuitry,
- processing circuitry in communication with the transceiver circuitry such that the processing circuitry is operable to:
- determine a characteristic of data for transmission between the wireless device and a network node;
- determine the wireless device is configured to send measurement information to the network node; and
- transmit an indication of the determined characteristic of data for transmission to the network node with the measurement information, wherein the processing circuitry is operable to transmit the indication of the characteristic of data for transmission and the measurement information to the network node by including the indication of the characteristic of data and the measurement information in one of a radio resource control (RRC) resume complete, RRC connection resume complete, RRC setup complete, RRC connection setup complete, RRC setup request, RRC connection request, user equipment information response, measurement report, random access request, and security mode command complete message.

11. The wireless device of claim 10, wherein the measurement information comprises an indication that measurements are available.

12. The wireless device of claim 11, wherein the measurement information comprises a measurement report.

13. The wireless device of claim 10, wherein the measurement information comprises early measurement information for early measurements performed during a dormant state, and the processing circuitry is operable to transmit the measurement information to the network node by transmitting the measurement information during a transition to a connected state.

14. The wireless device of claim 13, wherein the dormant state comprises one of RRC IDLE and RRC INACTIVE, and the connected state comprises RRC CONNECTED.

15. The wireless device of claim 10, wherein the measurement information comprises measurement information for measurements performed during a connected state and the processing circuitry is operable to transmit the measurement information to the network node by transmitting the measurement information during the connected state.

16. The wireless device of claim 10, the processing circuitry further operable to obtain a configuration instructing the wireless device to report the indication of the characteristics of data for transmission to the network node with the measurement information.

17. The wireless device of claim 16, wherein the processing circuitry is operable to obtain the configuration by receiving any one of the following from the network node:
- a message received prior to entering a dormant state;
- a message received during a transition from a dormant state to a connected state; and
- a message received via broadcast information.

18. The wireless device of claim 10, wherein the determined characteristic of data for transmission comprises at least one of a buffer status, a type of data, a quality of service profile, expected downlink traffic size, and a type of service.

19. A method performed by a network node, the method comprising:
- receiving, by the network node, from a wireless device, an indication of a characteristic of data for transmission between the wireless device and the network node and measurement information; and
- based on the characteristic of data for transmission between the wireless device and the network node, determining, by the network node, whether to configure the wireless device for operation in dual connectivity or carrier aggregation, wherein receiving the indication of the characteristic of data for transmission and the measurement information comprises receiving the indication of the characteristic of data and the measurement information in one of a radio resource control (RRC) resume complete, RRC connection resume complete, RRC setup complete, RRC connection setup complete, RRC setup request, RRC connection request, user equipment information response, measurement report, random access request, and security mode command complete message.

20. The method of claim 19, wherein the measurement information comprises an indication that measurements are available.

21. The method of claim 19, wherein the measurement information comprises a measurement report.

22. The method of claim 19, wherein the measurement information comprises early measurement information for early measurements performed during a dormant state of the wireless device, and receiving the measurement information comprises receiving the measurement information during a transition of the wireless device to a connected state.

23. The method of claim 22, wherein the dormant state comprises one of RRC IDLE and RRC INACTIVE, and the connected state comprises RRC CONNECTED.

24. The method of claim 19, wherein the measurement information comprises measurement information for measurements performed during a connected state of the wireless device and receiving the measurement information comprises receiving the measurement information during the connected state of the wireless device.

25. The method of claim 19, further comprising transmitting, to the wireless device, a configuration instructing the wireless device to report the indication of the characteristics of data for transmission to the network node with the measurement information.

26. The method of claim 25, wherein transmitting the configuration comprises transmitting any one of the following:
- a message transmitted prior to the wireless device entering a dormant state;
- a message transmitted during a transition of the wireless device from a dormant state to a connected state; and
- a message transmitted via broadcast information.

27. The method of claim 19, wherein the determined characteristic of data for transmission comprises at least one of a buffer status, a type of data, a quality of service profile, expected downlink traffic size, and a type of service.

* * * * *